United States Patent [19]

Suzuki

[11] Patent Number: 5,742,406
[45] Date of Patent: Apr. 21, 1998

[54] IMAGE PROCESSING APPARATUS

[75] Inventor: Takashi Suzuki, Tokyo, Japan

[73] Assignee: Canon Kabushiki Kaisha, Tokyo, Japan

[21] Appl. No.: 337,233

[22] Filed: Nov. 4, 1994

Related U.S. Application Data

[63] Continuation of Ser. No. 842,916, Feb. 27, 1992, abandoned.

[30] Foreign Application Priority Data

Mar. 1, 1991 [JP] Japan .................................. 3-035855

[51] Int. Cl.$^6$ ........................ H04N 1/40; H04N 1/32
[52] U.S. Cl. ..................... 358/468; 358/448; 358/401; 395/502
[58] Field of Search ............................ 358/468, 442, 358/444; 382/307, 302, 172; 395/502, 503, 505, 506, 595, 596

[56] References Cited

U.S. PATENT DOCUMENTS

| 4,476,497 | 10/1984 | Oshikoshi | 382/307 |
|---|---|---|---|
| 4,567,515 | 1/1986 | Schumacher | 358/448 |
| 4,719,516 | 1/1988 | Nagashima | 358/444 |
| 4,739,397 | 4/1988 | Hayashi | 358/500 |
| 4,807,020 | 2/1989 | Hirosawa et al. | 358/448 |
| 4,811,413 | 3/1989 | Kimmel | 382/302 |
| 4,847,654 | 7/1989 | Honma et al. | 358/500 |
| 4,910,691 | 3/1990 | Skeirik | 364/513 |
| 4,956,664 | 9/1990 | Hasegawa | 358/474 |
| 5,027,219 | 6/1991 | Stuttler et al. | 358/228 |
| 5,107,347 | 4/1992 | Hashimoto et al. | 358/448 |
| 5,125,045 | 6/1992 | Murakami | 382/50 |
| 5,175,635 | 12/1992 | Yamada et al. | 358/462 |
| 5,191,440 | 3/1993 | Levine | 358/448 |
| 5,210,571 | 5/1993 | Peloquin et al. | 355/203 |
| 5,212,519 | 5/1993 | Kasahara | 355/200 |
| 5,253,306 | 10/1993 | Nishio | 382/22 |
| 5,270,779 | 12/1993 | Kawai | 355/313 |
| 5,276,511 | 1/1994 | Takemoto | 358/500 |

FOREIGN PATENT DOCUMENTS

| 63-197282 | 8/1988 | Japan . |
|---|---|---|
| 63-197283 | 8/1988 | Japan . |
| 1152581 | 6/1989 | Japan . |
| 1284961 | 11/1989 | Japan . |

*Primary Examiner*—Edward L. Coles, Sr.
*Assistant Examiner*—Madeleine AV Nguyen
*Attorney, Agent, or Firm*—Fitzpatrick, Cella, Harper & Scinto

[57] ABSTRACT

In an image processing group of an image processing apparatus, clock pulses obtained by generating a reference pixel clock are counted in each of a plurality of different image processors. When a predetermined count value is attained, an input image signal is processed, a different count value is applied to each image processor, and the sequence of the processing operations is decided. Each image processor is connected to a single bus, and the processing sequence is changed by changing the count values applied to the image processors.

52 Claims, 38 Drawing Sheets

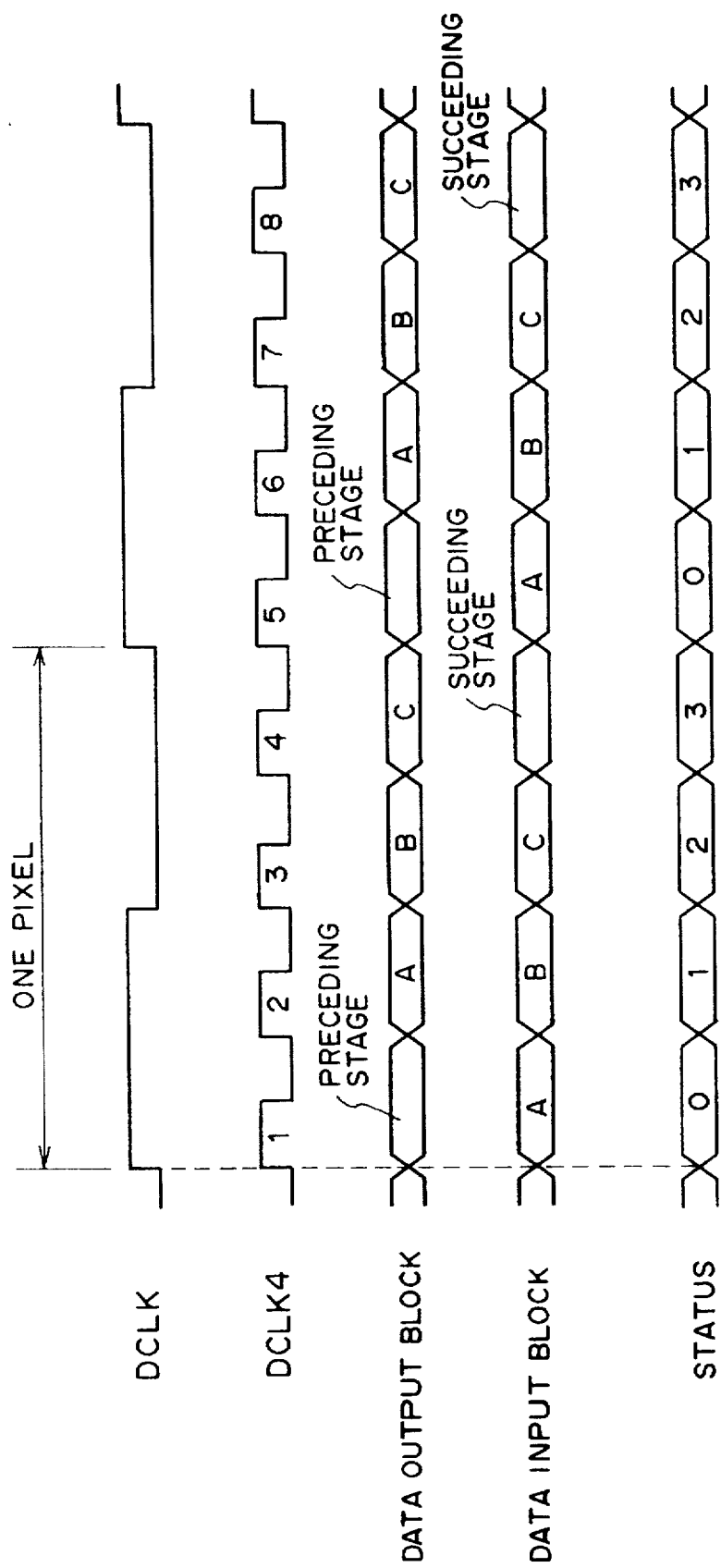
F I G. 13A

| STATUS | DATA INPUT BLOCK | DATA OUTPUT BLOCK |
|---|---|---|
| 0 | PRECEDING STAGE | A |
| 1 | A | B |
| 2 | B | C |
| 3 | C | SUCCEEDING STAGE |

F I G. 13B

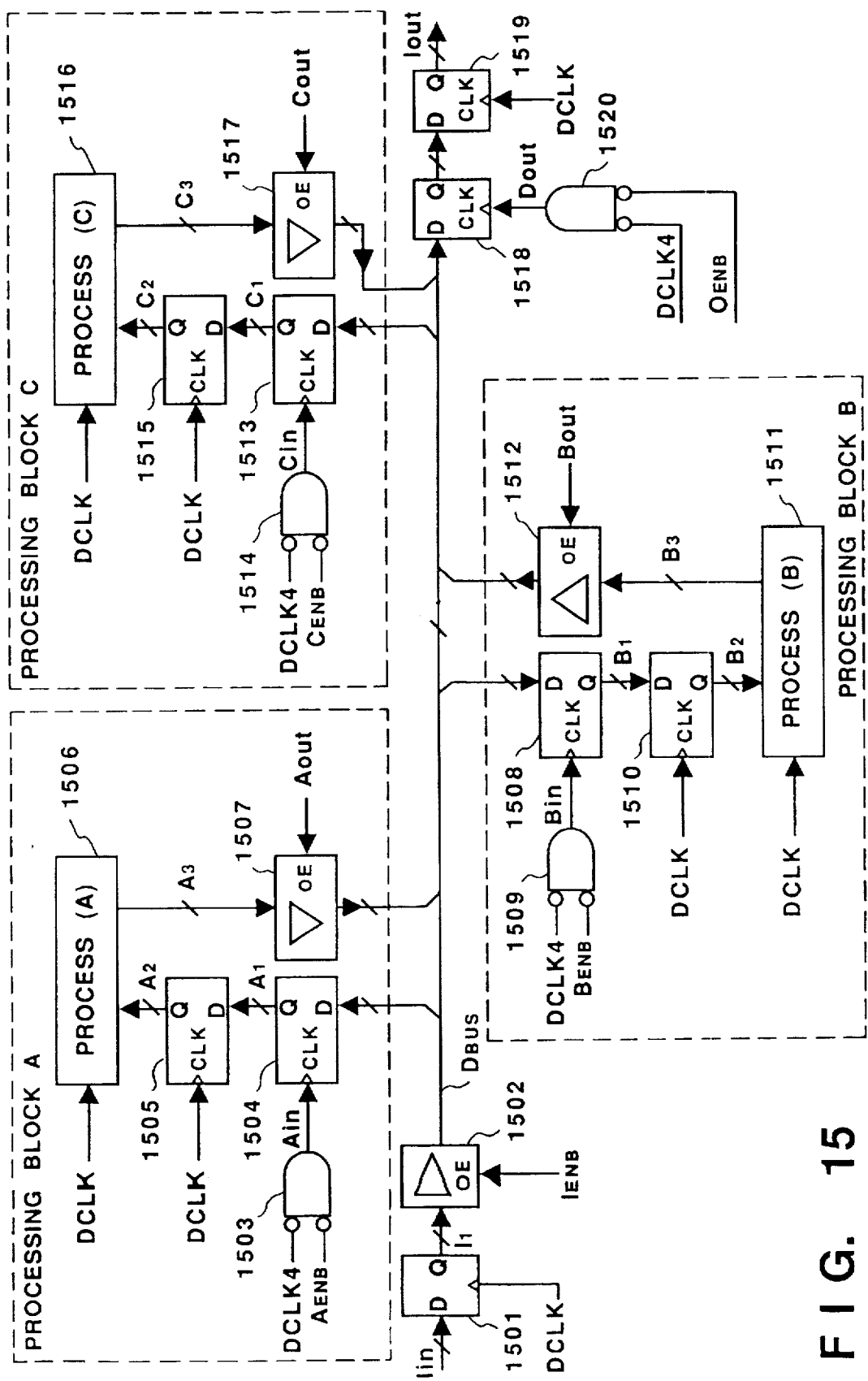
F I G. 15

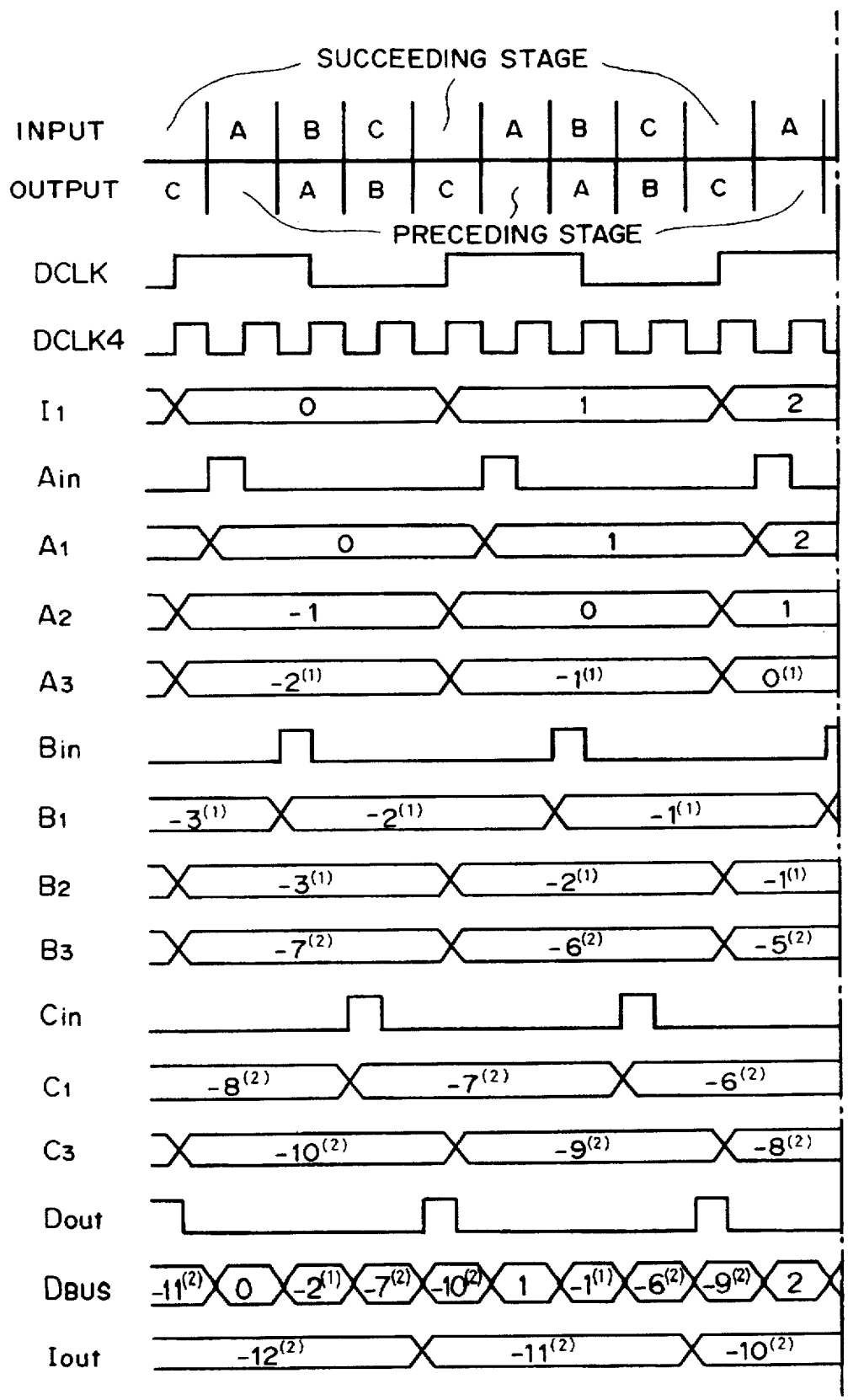
F I G. 16A

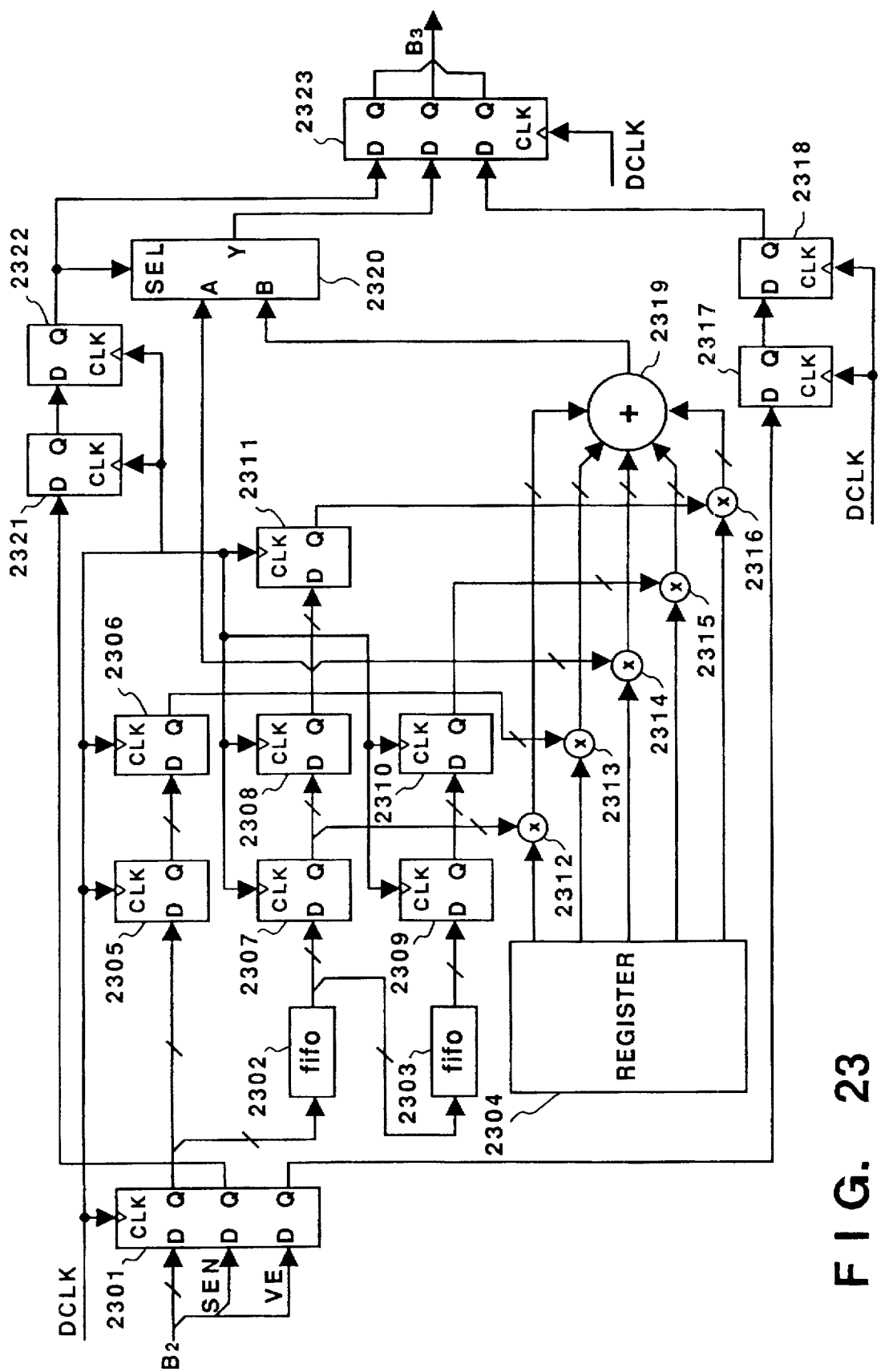
F I G. 23

|   | $P_1$ |   |
|---|---|---|
| $P_2$ | $P_0$ | $P_4$ |
|   | $P_3$ |   |

F I G.  25

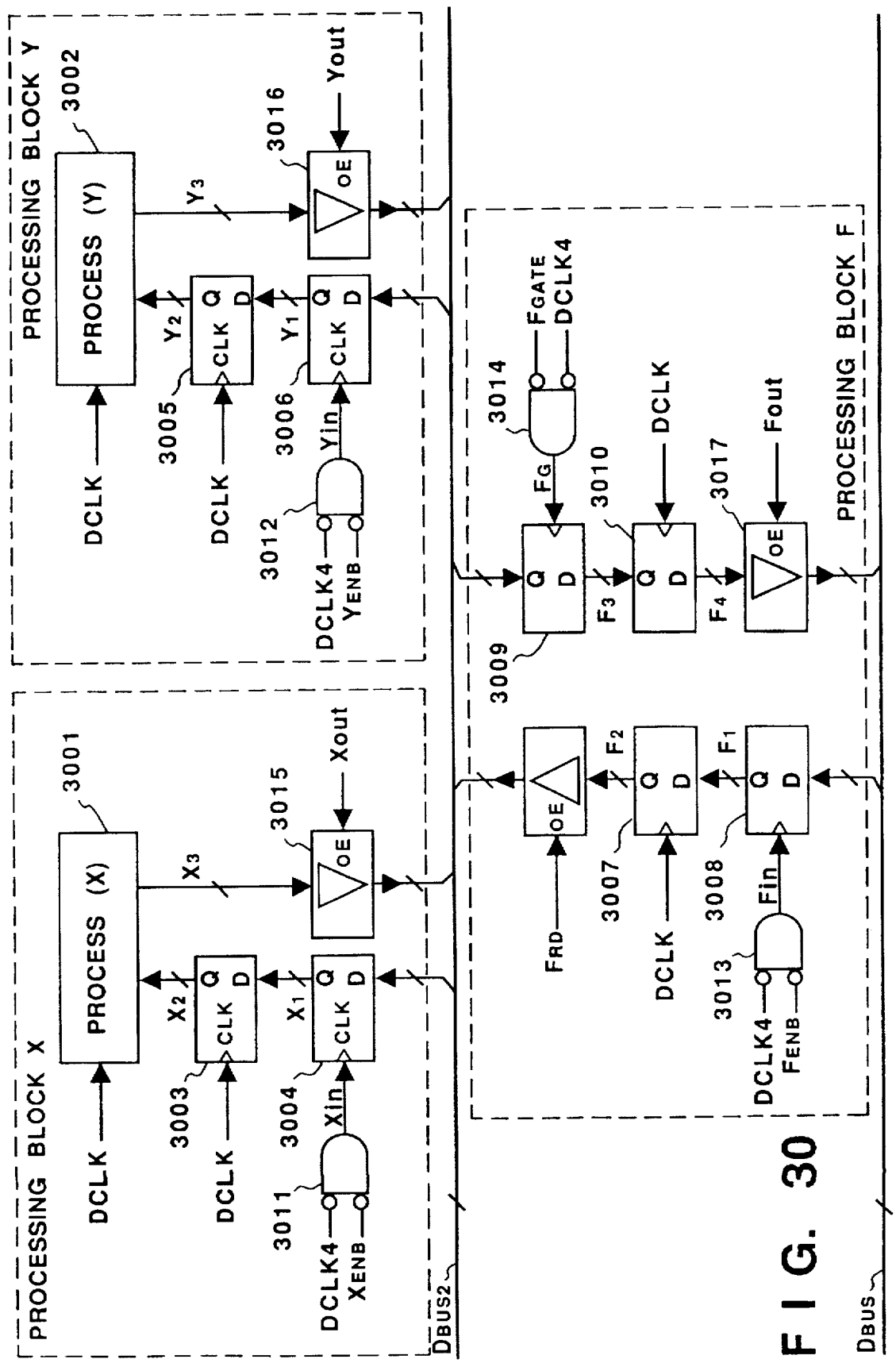
F I G. 30

IMAGE PROCESSING APPARATUS

This application is a continuation of application Ser. No. 07/842,916 filed Feb. 27, 1992, now abandoned.

BACKGROUND OF THE INVENTION

1. Field of the Invention

This invention relates to an image processing apparatus for processing an image signal in a copying machine or the like.

2. Description of the Related Art

FIG. 1 is a block diagram illustrating the flow of signal processing in an ordinary full-color digital copying machine. An image that has been formed on a CCD 5201 is photoelectrically converted in a three-line sensor and then applied as read signals of R, G and B components to an A/D converter 5202 which includes an amplifier and a sample-and-hold circuit. The A/D converter 5202 outputs an eight-bit digital image signal for each color. The digital image signal is applied to an image processing group 5203, at which the signal is subjected to image processing such as a shading correction and log conversion under the control of a controller 5200, which comprises a ROM, a RAM and a CPU, etc.

Since a log conversion is applied by the image processing group 5203 in accordance with the following equations, the RGB signal is converted into a CMY signal, so that the output of the image processing group 5203 is a CMY signal:

$$C = -255 \cdot \log_{10}[R/255]$$

$$G = -255 \cdot \log_{10}[G/255]$$

$$Y = -255 \cdot \log_{10}[B/255]$$

In a black extracting unit 5204, a black component K contained in the CMY signal is decided in accordance with the following equation:

$$K = \min(C, M, Y)$$

The density signals C, M, Y, K of the four colors, inclusive of K, are subjected to under-color removal in a UCR/masking unit 5205. In addition, an arithmetic operation is performed in accordance with the following equation in order to eliminate unnecessary chromatic color in the developer of a printer 5207:

$$M' = a_{11}, a_{12}, a_{13}, a_{14}(1-u1)M$$

$$C' = a_{21}, a_{22}, a_{23}, a_{24}(1-u2)C$$

$$Y' = a_{31}, a_{32}, a_{33}, a_{34}(1-u3)Y$$

$$K' = a_{41}, a_{42}, a_{43}, a_{44}K$$

where $a_{11} \sim a_{14}$, $a_{21} \sim a_{24}$, $a_{31} \sim a_{34}$, $a_{41} \sim a_{44}$ represent predetermined masking coefficients for eliminating unnecessary chromatic color, and u1, u2, u3 represent UCR coefficients for removing the K component from the M, C, Y color components. One of the signals M', C', Y', K' is selected by a two-bit development color signal PHASE from the controller 5200, and the selected signal is outputted as a signal V1. M', C', Y', K' are selected in conformity with 0, 1, 2, 3 of the PHASE signal.

A gamma (hereinafter referred to as "γ")-converter 5206 subjects the image to a density conversion. The γ-converter 5206 comprises a ROM, to which the eight-bit signal V1 is inputted as a ROM address, for delivering a corresponding γ-converted output as an eight-bit signal V2 from a ROM data terminal. The signal V2 is fed into the multivalued output printer 5207, which relies upon the well-known dither method or the like, whereby a printer output is obtained.

However, in a case where three types of processing A, B and C, for example, are executed in the image processing group 5203 in accordance with the prior art, the hardware for the image processing is so constructed that the image signal flows sequentially in accordance with each processing procedure.

With an arrangement of this kind, the processing procedure is decided in dependence upon the hardware and therefore extensions or changes to the processing technique cannot be performed in a flexible manner.

SUMMARY OF THE INVENTION

An object of the present invention is to provide an image processing apparatus in which the aforementioned drawback of the related art can be eliminated.

Another object of the present invention is to provide an image processing apparatus in which a processing algorithm pertaining to image processing can be changed in a flexible manner.

A further object of the present invention is to provide an image processing apparatus in which the image processing technique can be expanded and changed with facility.

Still another object of the present invention is to provide an image processing apparatus in which, in the case of a copying machine, the hardware of common image processors can be shared by consolidating bus specifications even between machines of different types, thus making is possible to lower the cost of hardware.

A further object of the present invention is to provide an image processing apparatus featuring improved operability.

Another object of the present invention is to provide an image processing apparatus comprising image processing means having a plurality of different image processing methods, generating means for generating a reference pixel clock, control means for controlling each operating sequence of the plurality of different image processing methods in accordance with the pixel clock generated by the generating means, and executing means for executing the image processing means in accordance with the control performed by the control means.

Another object of the present invention is to provide an image processing apparatus comprising image processing means having a plurality of different image processing methods, changeover means for changing over a combination of the plurality of different image processing methods in synchronization with a pixel clock, and executing means for executing the image processing means in accordance with the combination obtained by the changeover means.

Another object of the present invention is to provide an image processing apparatus comprising image processing means having a plurality of different image processing methods, generating means for generating pixel clocks which exceeds at least the number of the plurality of different processing methods in accordance with a reference pixel clock, control means for controlling each operating sequence of the plurality of different image processing methods in accordance with the pixel clock generated by the generating means, and executing means for executing the image processing means in accordance with the control performed by the control means.

Another object of the present invention is to provide an image processing apparatus comprising image processing means having a plurality of different image processing methods, generating means for generating a reference pixel clock, memory means for storing, as a status signal, each operating sequence of the plurality of different image processing methods, control means for controlling each operating sequence of the plurality of different image processing methods upon synchronizing the status signal stored in the memory means to a pixel clock generated by the generating means, and executing means for executing the image processing means in accordance with the control performed by the control means.

Another object of the present invention is to provide an image processing apparatus comprising image processing means having a plurality of different image processing methods, frequency dividing means for generating a reference pixel clock, allocating means for allocating data of a pixel before or after a specific pixel to one of the plurality of different types of image processing methods in synchronization with the pixel clock generated by the frequency dividing means, control means for controlling each operating sequence of the plurality of different image processing methods in accordance with the allocation performed by the allocating means, and executing means for executing the image processing means in accordance with the control performed by the control means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13A is a timing chart showing the timing between an image signal and an image clock DCLK according to the fifth embodiment;

FIG. 13B is a table showing the relationship between a status signal and data input/output associated with the arrangement of FIG. 13A;

FIG. 15 is a block diagram showing the construction of an image processing apparatus according to the sixth embodiment of the present invention;

FIGS. 16A and 16B are timing charts associated with the circuit of FIG. 15;

FIG. 23 is a block diagram showing a circuit for edge emphasis according to the sixth embodiment;

FIG. 25 is a diagram showing an example of a mask for edge emphasis according to the sixth embodiment;

FIG. 30 is a block diagram showing the construction of an image processing apparatus according to a seventh embodiment of the present invention;

DESCRIPTION OF THE PREFERRED EMBODIMENTS

Preferred embodiments of the present invention will now be described in detail with reference to the accompanying drawings.

<First Embodiment>

Figure 2:
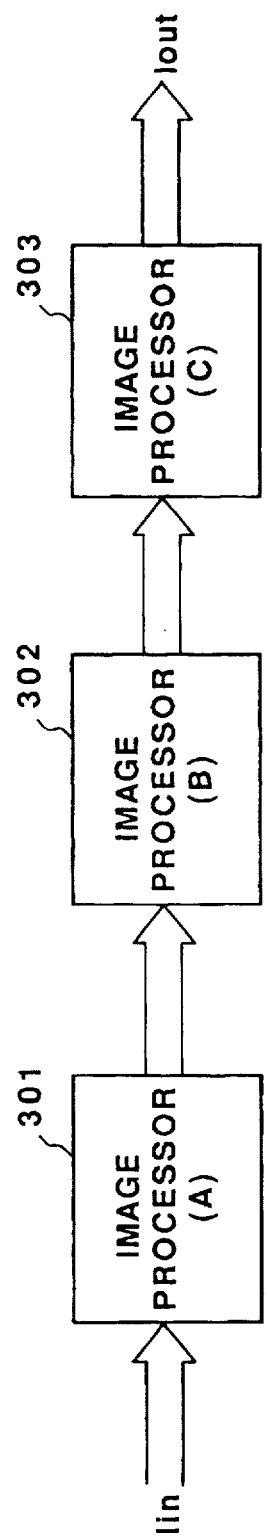
FIG. 2 is a block diagram showing the construction of an ordinary image processing apparatus.
Figure 3:
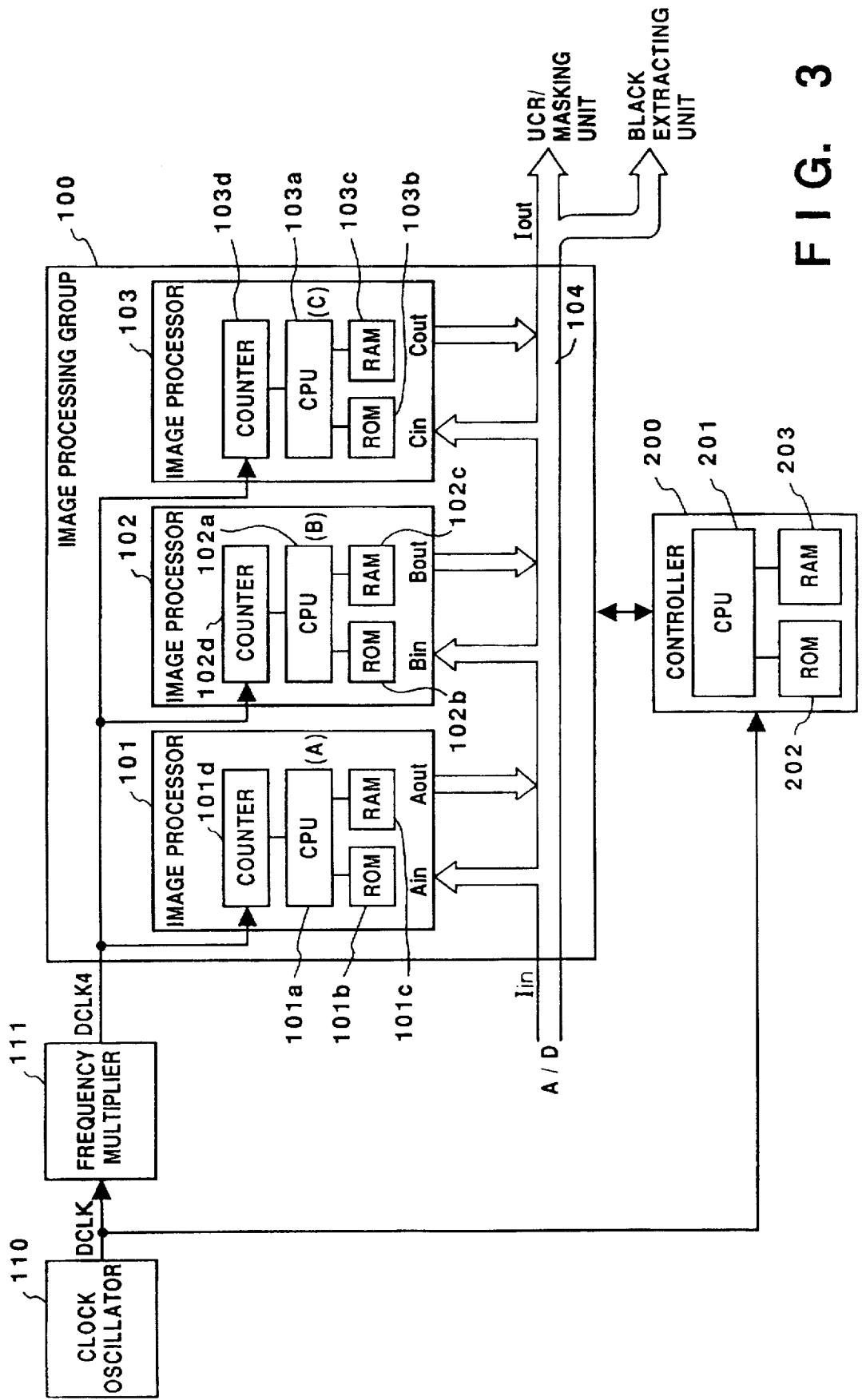
FIG. 3 is a block diagram showing the construction of an image processing apparatus according to a first embodiment of the present invention.

FIG. 2 is a block diagram showing the construction of an ordinary image processing apparatus, and FIG. 3 is a block diagram showing the construction of an image processing apparatus according to a first embodiment of the present invention.

In general, in order to subject an input image signal Iin to image processing and obtain an output image signal Iout, an image processing group 5203 is provided so as to perform processes (A), (B) and (C) in the order of an image processor 301, image processor 302 and image processor 303, as illustrated in FIG. 2.

Thus, the general practice is to execute a plurality of types of image processing sequentially in the image processing group 5203. However, it has not been possible to obtain an arrangement capable of satisfying the need to deal flexibly with extensions and changes in the image processing method.

Accordingly, a first embodiment of the present invention, which is capable of dealing flexibly with extensions and changes in the image processing method, will now be described.

Figure 1:
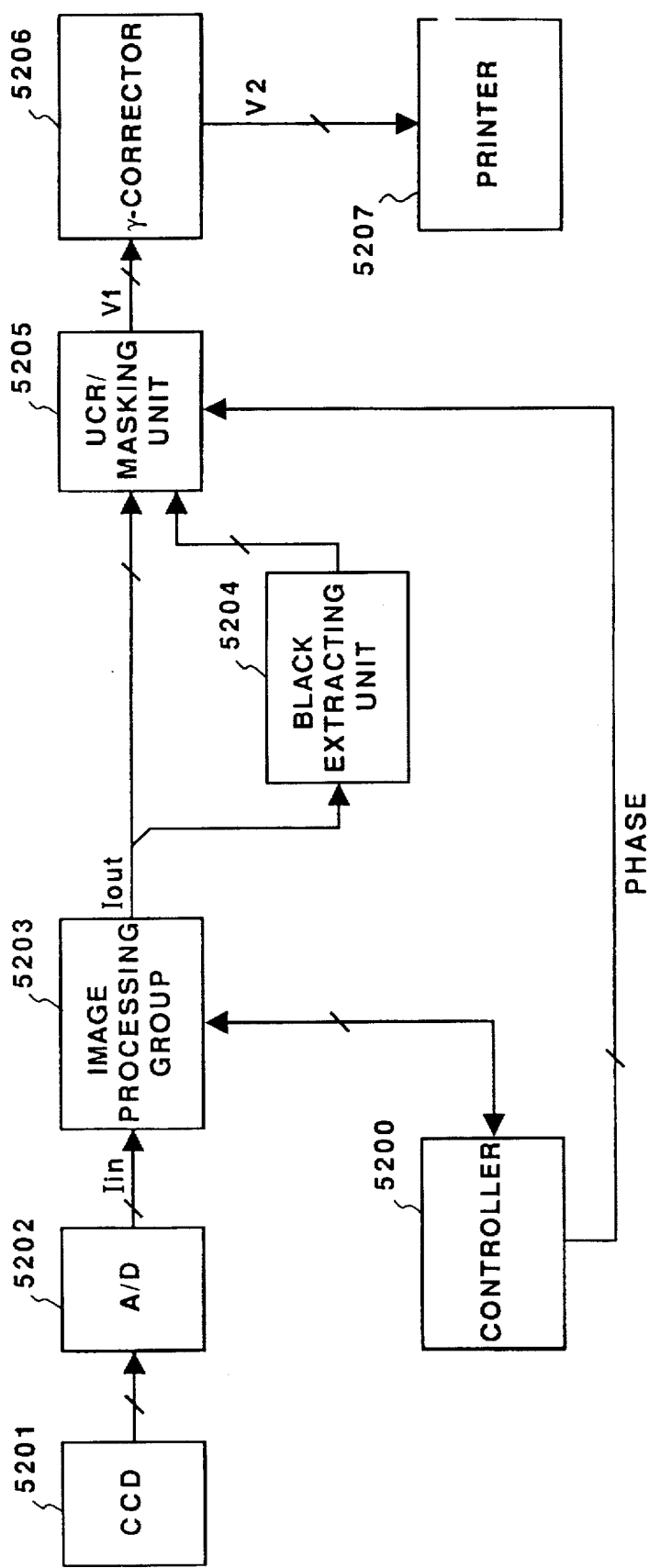
FIG. 1 is a block diagram illustrating the flow of signal processing in an ordinary full-color digital copying machine.

The overall arrangement (flow of signals) of a copying machine is similar to the block diagram of FIG. 1 described above in connection with the prior art, and therefore this need not be described again. In FIG. 3, numeral 100 denotes an image processing group having image processors 101, 102 and 103 which perform processes (A), (B), (C), respectively. The three image processors 101, 102, 103 are connected to an image signal bus 104. A clock oscillator 110 generates a reference image clock DCLK. A frequency multiplier 111 generates a clock DCLK4 the frequency of which is four times that of the image clock DCLK4 outputted by the clock oscillator 110. A controller 200 for controlling the overall image processing apparatus has a CPU 201 which executes various programs that have been stored in an internal ROM 202 of the controller 200, and which uses an internal RAM 203 as a working area.

The image processor 101 includes a CPU 101a for controlling connection to the bus, a ROM 101b in which various programs have been stored, a RAM 101c used as a program working area, and a counter 101d for counting CLK4. Similarly, the image processors 102, 103 have CPUs 102a, 103a; ROMs 102b, 103b; RAMs 102c, 103c; and counters 102d; 103d; respectively. The image processors 101~103 are connected to the bus in a predetermined image processing sequence. In a case where processing for one pixel is performed in the image processing group 100, the counters 101d~103d of the respective image processors 101~103 count the positive-going transitions of DCLK4, and data processing is performed by each image processor when its counter counts up to a prescribed value. The count information allocated to each of the image processors 101~103 is received from the controller 200 in advance. The operation will be described below in detail.

Figure 4:
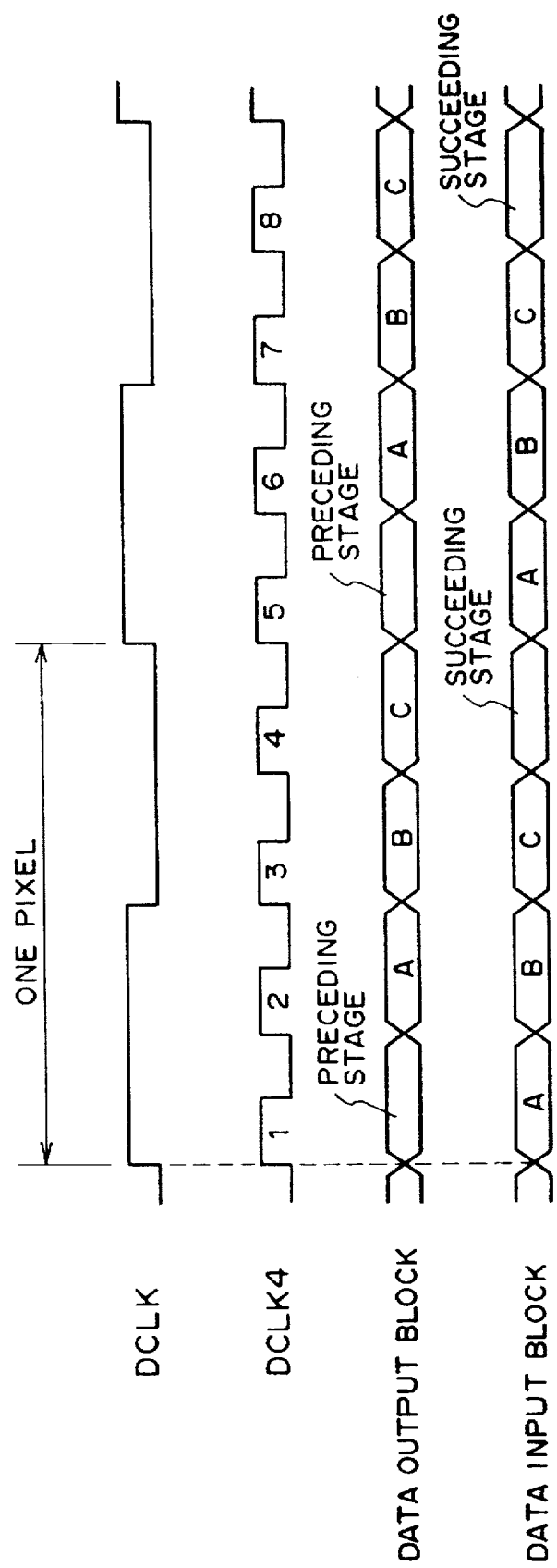
FIG. 4 is a timing chart showing the timing between an image signal and an image clock DCLK according to the first embodiment.

FIG. 4 is a timing chart showing the timing between an image signal and the image clock DCLK according to the first embodiment.

The connection of the image processors 101~103 to the bus is changed over at the positive-going transitions of the clock DCLK4 whose frequency is four times that of the image clock DCLK. Each of the image processors 101~103 has the aforementioned CPU which controls the connection to the bus. In response to a command from the controller 200, the image processors 101~103 count DCLK4 and effect the connection to the bus in a predetermined image processing sequence. Each positive-going transition of DCLK is the start of processing of a pixel unit.

In FIG. 4, an input (Ain) for process (A) leads to the output of process of the preceding stage of the image processing group 100 at the first and fifth positive-going transitions of DCLK4. An output (Aout) for process (A) and an input (Bin) for process (B) are connected to the image signal bus 104 at the second and sixth positive-going transitions of DCLK4, respectively. An output (Bout) for process (B) and an input (Cin) for process (C) are connected to the bus at the third and seventh positive-going transitions of DCLK4, respectively. An output (Cout) for process (C) and an input of the succeeding stage of the image processing group are connected to the image signal bus 104 at the fourth and eighth positive-going transitions of DCLK4.

Thus, the image signal is processed in time-shared fashion in the order of process (A) (image processor 101), process (B) (image processor 102) and process (C) (image processor 103).

The sequence of the image processors is set by the controller 200. The sequence can be designated by making an input from a device such as a keyboard or control panel (not shown) or by a command input in response to communication from an external device.

Thus, in accordance with the first embodiment as described above, an image signal bus used in common by a plurality of image processors is provided and the sequence of the image processors is set at will, whereby the image processing technique can be expanded and changed with facility.

<Second Embodiment>

In the arrangement of the first embodiment, the connection between the image processors and the image signal bus is changed over every pixel. However, this does not impose a limitation upon the invention, for the image processing procedure may be changed over for each area of one image. This method will be described in accordance with a second embodiment of the invention.

Figure 5:
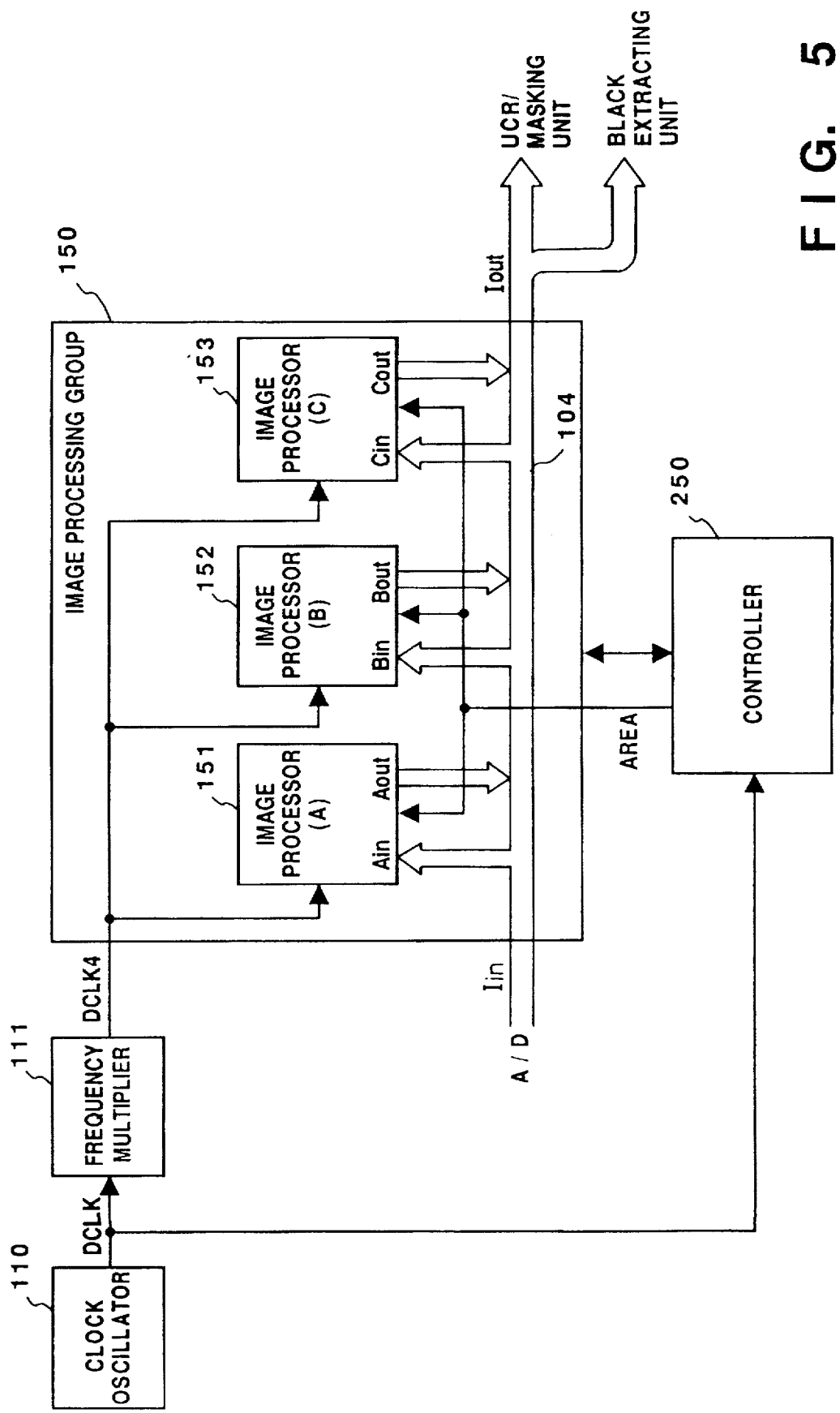
FIG. 5 is a block diagram showing the construction of an image processing apparatus according to a second embodiment of the present invention.

FIG. 5 is a block diagram illustrating the construction of an image processing apparatus according to the second embodiment. Circuits in FIG. 5 similar to those in FIG. 3 are designated by like reference characters and need not be described again. Only components and functions different from those of the first embodiment will be described.

The second embodiment is characterized in that the processing procedure is changed over for each area of one image. As shown in FIG. 5, numeral 150 denotes an image processing group having image processors 151~153. Though the image processors 151~153 execute processing similar to that of the image processors 101~103 of the first embodiment, each has a new function wherein the processing procedure is changed over from the next pixel when an area signal AREA is outputted by a controller 250. As in the first embodiment, the controller 250 has a CPU, a ROM and a RAM (none of which are shown) and the processors 151, 152, 153 each have a counter, a CPU, a ROM and a RAM (none of which are shown ).

Figure 6A:
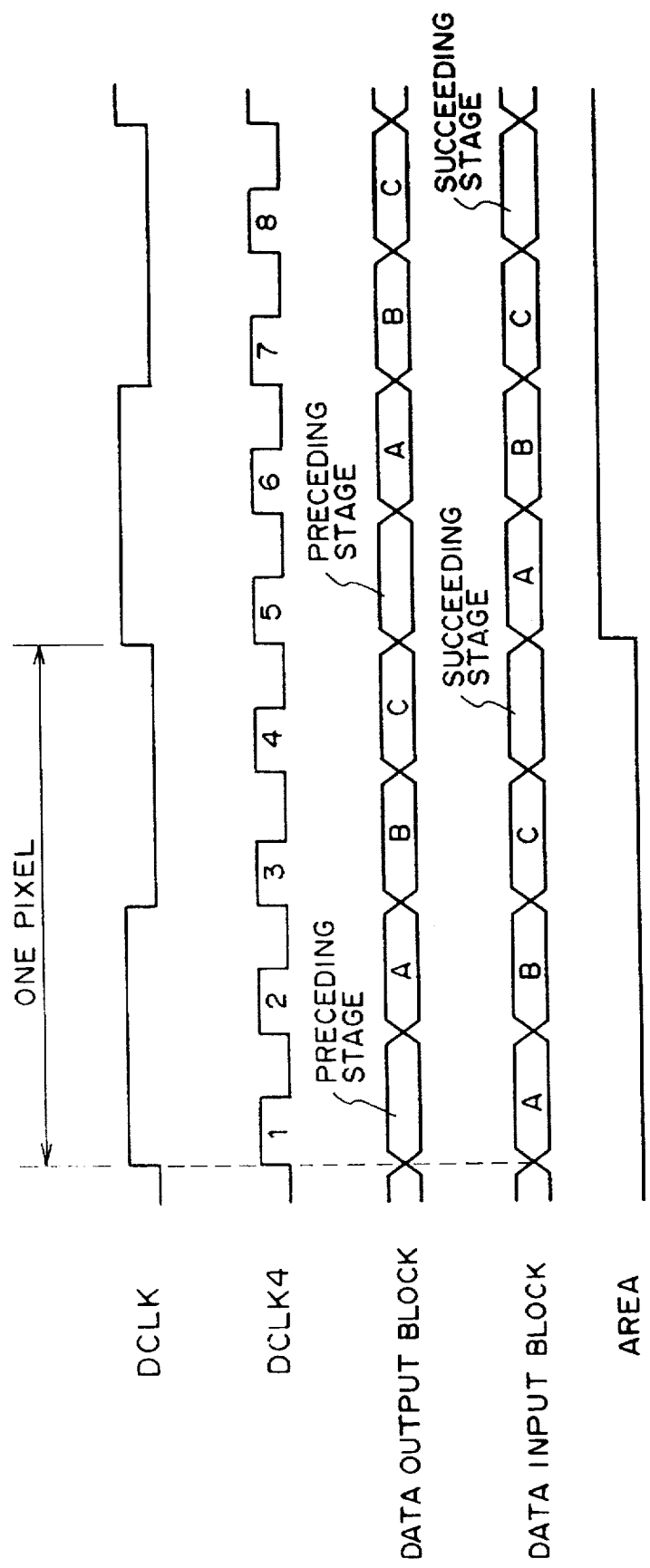
FIG. 6A is a timing chart showing the timing between an image signal and an image clock DCLK according to the second embodiment.
Figure 6B:
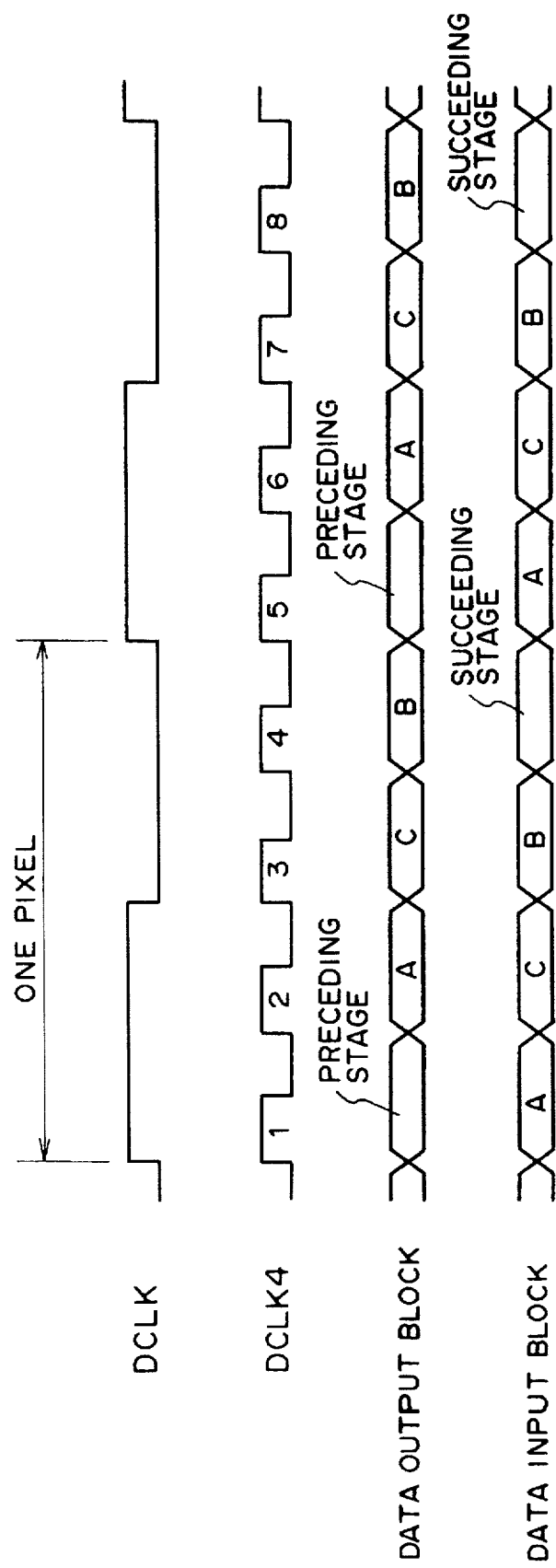
FIG. 6B is a timing chart showing a modification of the timing chart according to the second embodiment.

FIG. 6A is a timing chart showing the timing between an image signal and an image clock DCLK according to the second embodiment, and FIG. 6B is a timing chart showing a modification of the timing chart according to the second embodiment.

If the timing chart of FIG. 6A (second embodiment) and the timing chart of FIG. 4 (first embodiment) are compared, it will be seen that the sequence of processes (B) and (C) in FIG. 6A is set so as to reverse starting from the processing of a certain pixel. At such time, the controller 200 applies the signal AREA, which is indicative of the area of the image at which the sequence of processes (B) and (C) is interchanged, to all of the image processors 101~103. The image processors 101–103 effect the connections to the bus from the moment of the positive-going transition of the signal AREA at the sequence of processes (A), (C), (B), which is a separate predetermined processing procedure. At the moment of the trailing edge of the signal AREA, the original bus connection procedure is restored in such a manner that the processing procedure will return to the sequence of (A), (B), (C). Of course, it is possible to change the order of processes (B) and (C) over the entire area of the image. Ordinarily, in a full-color digital copying machine, process (A) pertains to a shading correction in which sensitivity is corrected for each pixel of the CCD, process (B) pertains to a log conversion, and process (C) pertains to negative-positive reversal processing. In this case, processing is executed in the order of (A), (B) and (C) with regard to a reflective original document. However, in a case where reading is performed optically through the positive of a film, it is preferred that the RGB signal that prevails prior to the log conversion be subjected to negative-positive reversal processing, after which the log conversion is carried out. Therefore, processing is executed in the order (A), (C), (B).

Thus, in accordance with the second embodiment as described above, in a case where the processing procedure is changed over between the processing sequence (A), (B), (C) and the processing sequence (A), (C), (B), the bus connections at the timing shown in FIG. 6A can be realized by changing over the processing procedure through software without providing two separate systems of processing circuitry (i.e., two types of processing procedures). In other words, an increase in circuit complexity and a rise in cost due to greater reliance upon hardware can be prevented, and changes can be made with ease merely by modifying software.

<Third Embodiment>

Figure 7:
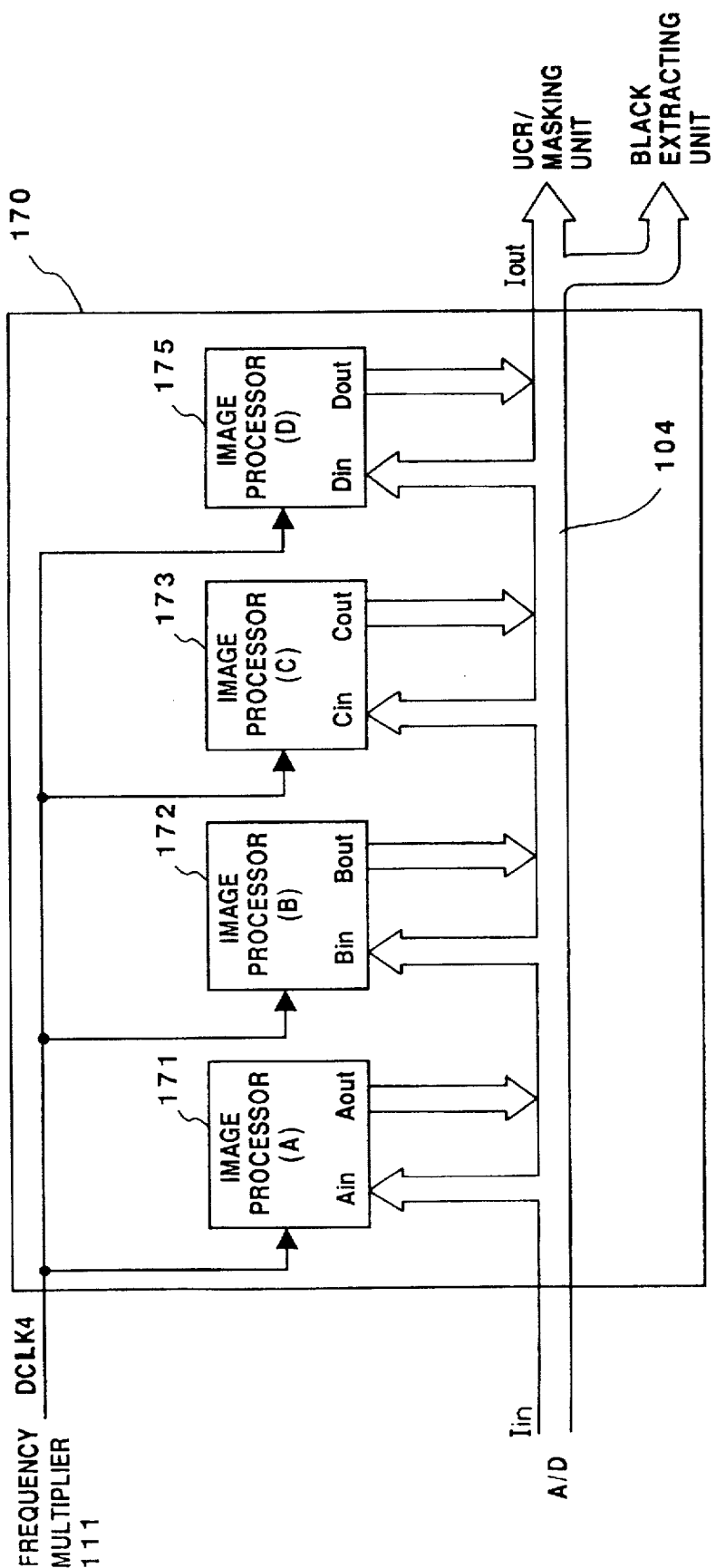
FIG. 7 is a block diagram showing the construction of an image processing apparatus according to a third embodiment of the present invention.
Figure 8:
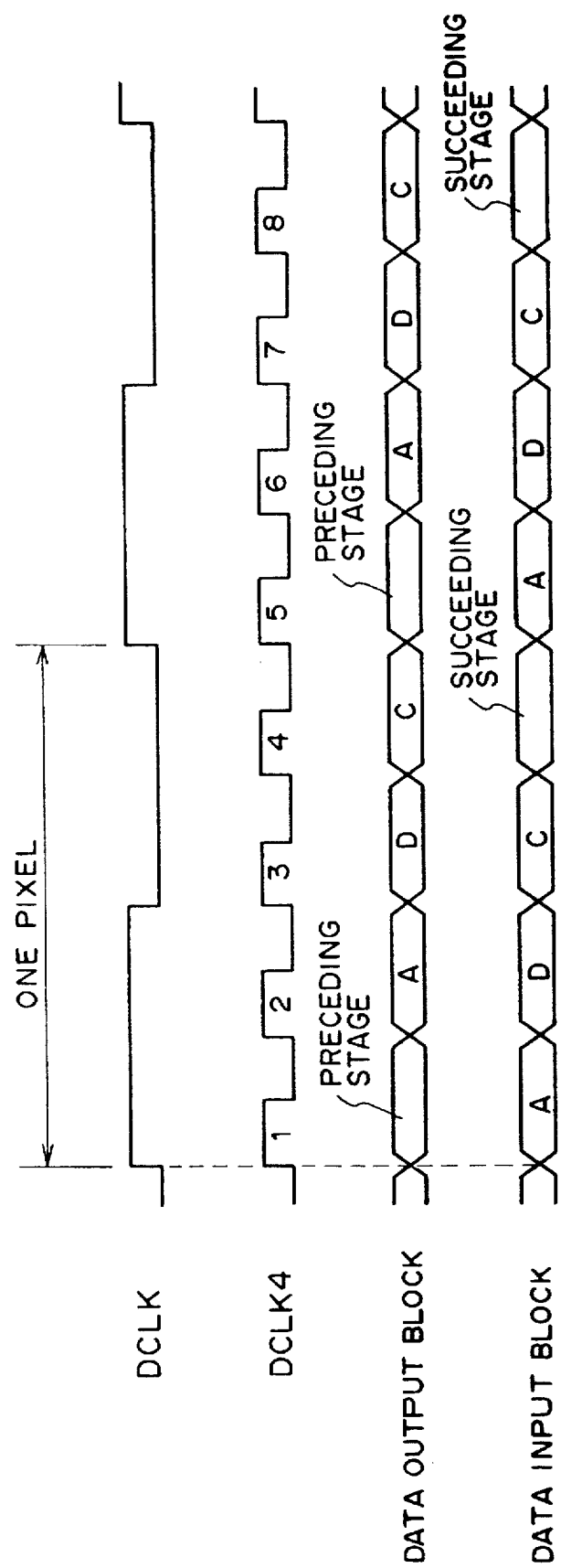
FIG. 8 is a timing chart showing the timing between an image signal and an image clock DCLK according to the third embodiment.

FIG. 7 is a block diagram showing the construction of an image processing apparatus according to a third embodiment of the present invention, and FIG. 8 is a timing chart showing the timing between an image signal and the image clock DCLK according to a third embodiment of the invention.

As shown in FIG. 7, the third embodiment has a construction similar to that of the first embodiment (FIG. 3). In this arrangement, however, image processors 171–173, which are connected to the image signal bus 104 and correspond to the image processors 101–103, are supplemented by an additional image processor 175 for performing process D. In this embodiment, only the principal components are illustrated in FIG. 7, and such circuits as the controller are deleted from the drawing. The additional image processor 175 has a CPU, a ROM and a RAM, just as the other image processors 171–173.

As illustrated in FIG. 8, the image processor 175 performs process (D) instead of process (B). Thus, if openings are provided in the image signal bus 104 in advance, processes can be added on or changed with ease.

By way of example, in the processing of an actual copying machine, process (A) pertains to a shading correction, process (B) pertains to a log conversion for reflective originals, process (C) pertains to negative-positive reversal processing, and process (D pertains to a log conversion for a film negative.

When it is attempted to realize processing of both sequence (A), (B), (C) and sequence (A), (D), (C) by a single apparatus, the prior art is such that an arrangement is required in order to change over the processing between (B) and (D). However, a device for copying film ordinarily is an option and there are cases in which such a device cannot be attached. In such cases, an arrangement for changing over processing must be provided even though it is unnecessary, and this is a cause of higher cost overall. In accordance with the third embodiment, however, an arrangement for changing over the processing procedure may be dispensed with, the apparatus is simplified and cost is lowered.

<Fourth Embodiment>

The frequency of the clock for synchronizing the connection of each processing block to the image signal bus is dependence upon the processing speed of each image processor. For this reason, the clock frequency is set to the upper-limit value of the processing speed to assure that the system can be expanded for such time that processing is subsequently increased. This embodiment also has an arrangement similar to that of FIG. 3 and only the differences will be described below.

Figure 9:
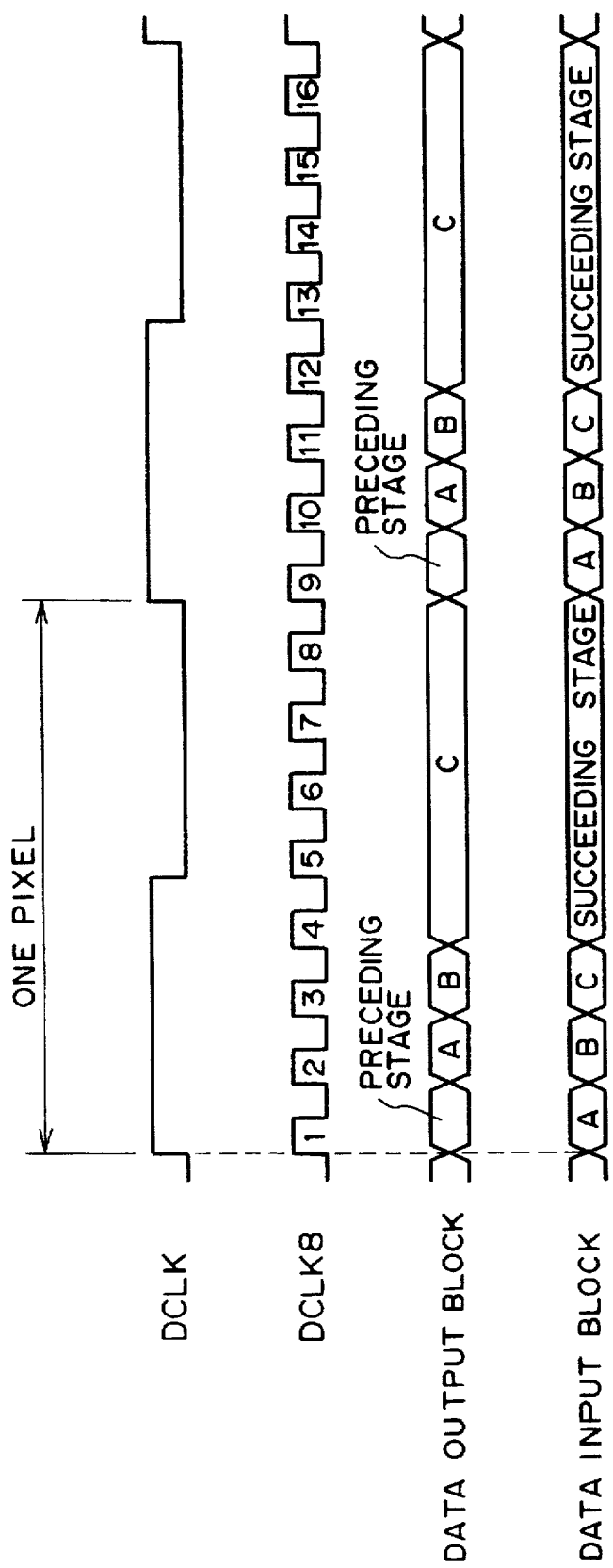
FIG. 9 is a timing chart showing the timing between an image signal and an image clock DCLK according to a fourth embodiment.

FIG. 9 is a timing chart showing the timing between an image signal and an image clock DCLK according to a fourth embodiment.

As shown in FIG. 9, the fourth embodiment employs a timing in which connection to the image signal bus 104 is synchronized by a clock DCLK8 having a frequency twice that of the frequency used in the first embodiment. As a result, it will be understood that there is no change in the connection to the bus from the fourth to the eighth positive-going transitions of DCLK8. That is, the clock of each process during the processing time of one pixel is subdivided so that there are more clock pulses than in the first embodiment, as a result of which some margin is provided for the number of processes so that it becomes possible to add on process from process (C) onward. Thus, a process expansion capability is obtained.

Figure 10:
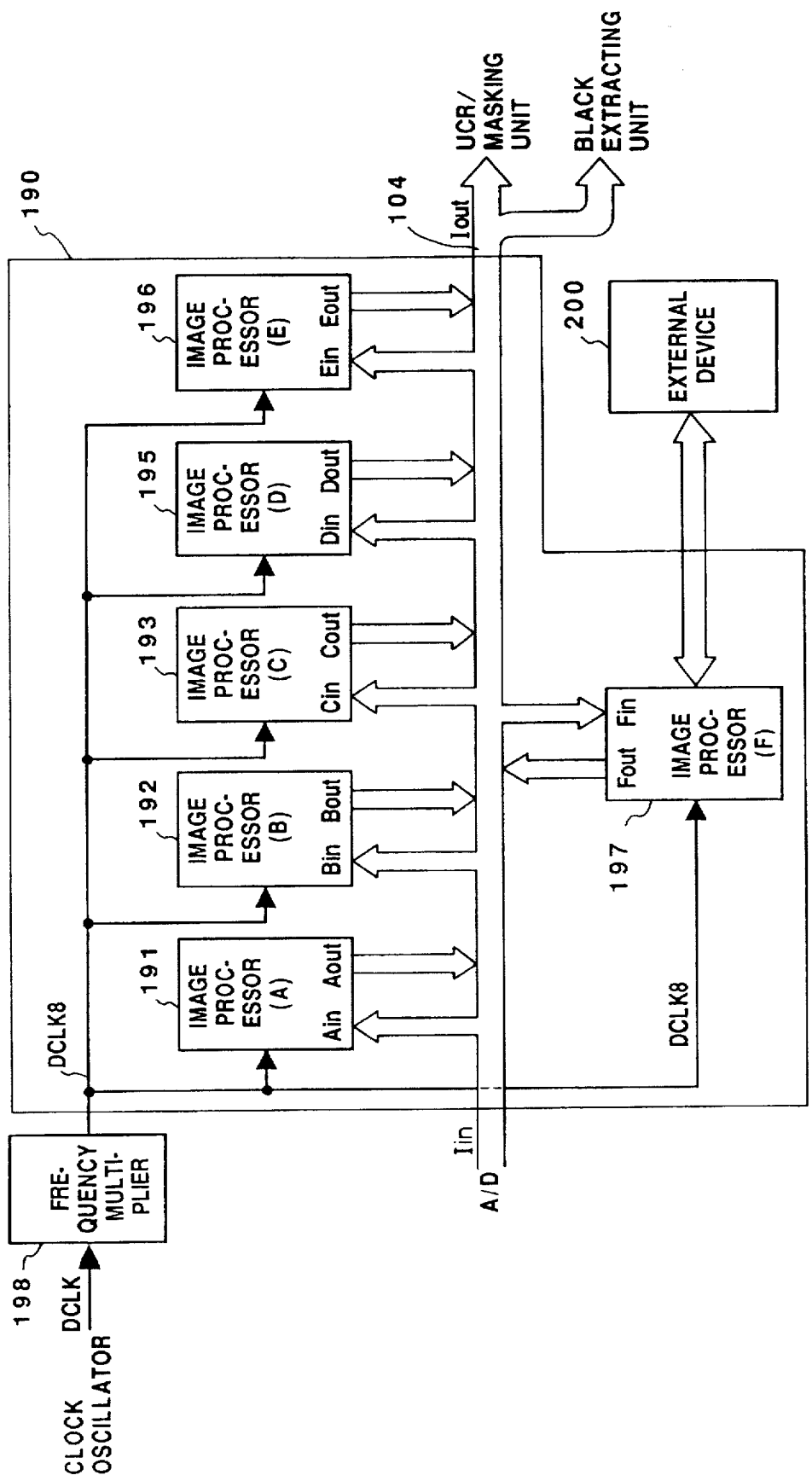
FIG. 10 is a block diagram showing a modification of the fourth embodiment.
Figure 11:
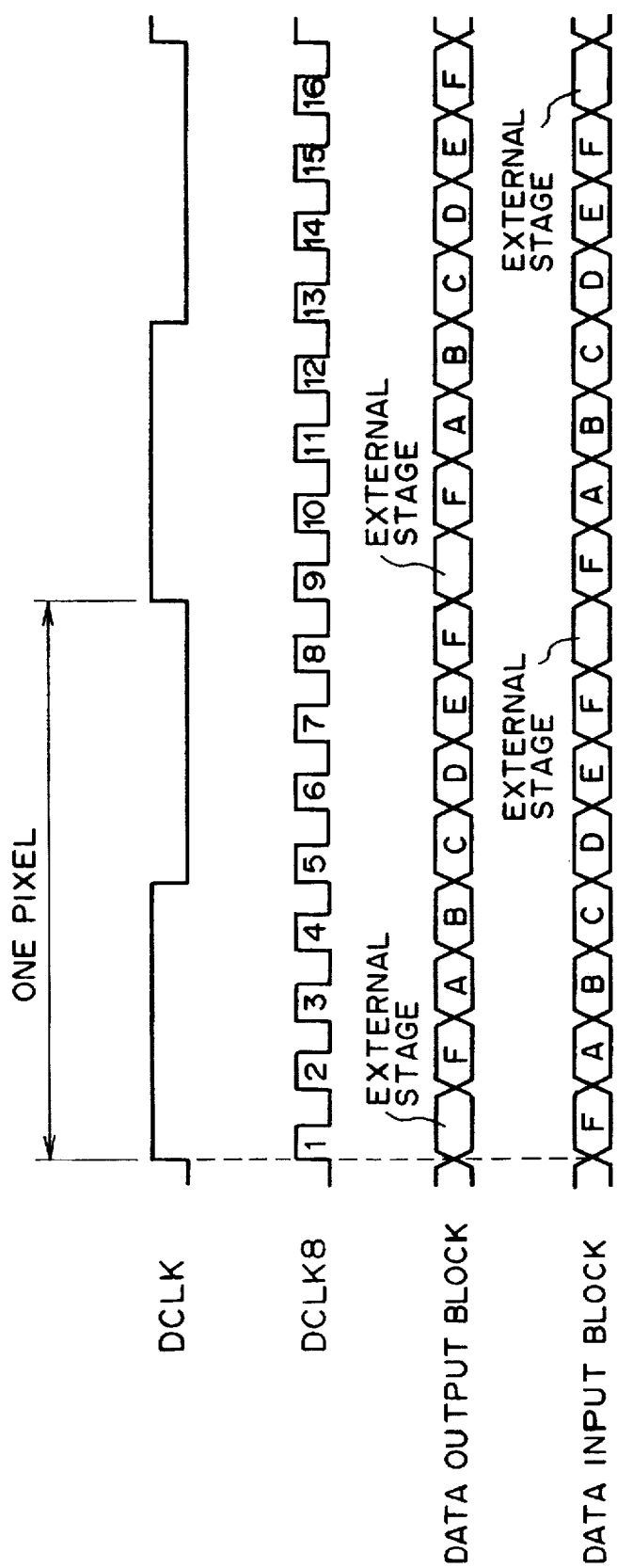
FIG. 11 is a timing chart associated with FIG. 10.

FIG. 10 is a block diagram showing a modification of the fourth embodiment, and FIG. 11 is a timing chart associated with FIG. 10.

The modification using DCLK8 will be described with reference to FIG. 10.

With the apparatus of FIG. 10, the number of processes can be greatly increased, as illustrated in FIG. 11. The processing of FIG. 11 represents the following processing in a full-color digital copying machine: Process (A) corresponds to a shading correction, (B) to a log conversion, (C) to negative-to-positive reversal processing, (D) to color-conversion processing, (E) to smoothing processing for outputting the average value of the immediately preceding item of image data and the present item of image data, and (F) to interface processing for inputting/outputting data relative to an external device.

In FIG. 10, numeral 198 denotes a frequency multiplier for multiplying a reference clock, which has been transmitted from a clock oscillator (not shown), to a clock DCLK8 having eight times the frequency. Numerals 191–196 denote image processors for executing the aforementioned processes (A)–(E). Numeral 197 designates an image processing unit for executing the process (F), namely interface processing such as for synchronizing the input/output of data with respect to an external device 200. The image processor 197 is connected to the external device 200.

As shown in FIG. 11, image data outputted by the external device 200 is inputted to process (F) at the first and ninth positive-going transitions of DCLK8, and the process (F) outputs the image data, which has been received from process (E) at the seventh and ninth positive-going transitions of DCLK8, to the external device 200 at the eighth and 16th positive-going transitions of DCLK8.

<Fifth Embodiment>

In the first embodiment described earlier, a method of connecting each image processor to the image signal bus 104 is described in which each image processor counts the clock pulses for timing the connection and effects the connection to the bus when a predetermined number of clock pulses has arrived.

By contrast, in the fifth embodiment described below, the image processors do not require counters, and therefore the arrangement can be simplified to the extent that the counters are not provided. Accordingly, in comparison with the first embodiment, the fifth embodiment makes it possible to reduce cost by virtue of a simpler arrangement.

Figure 12:
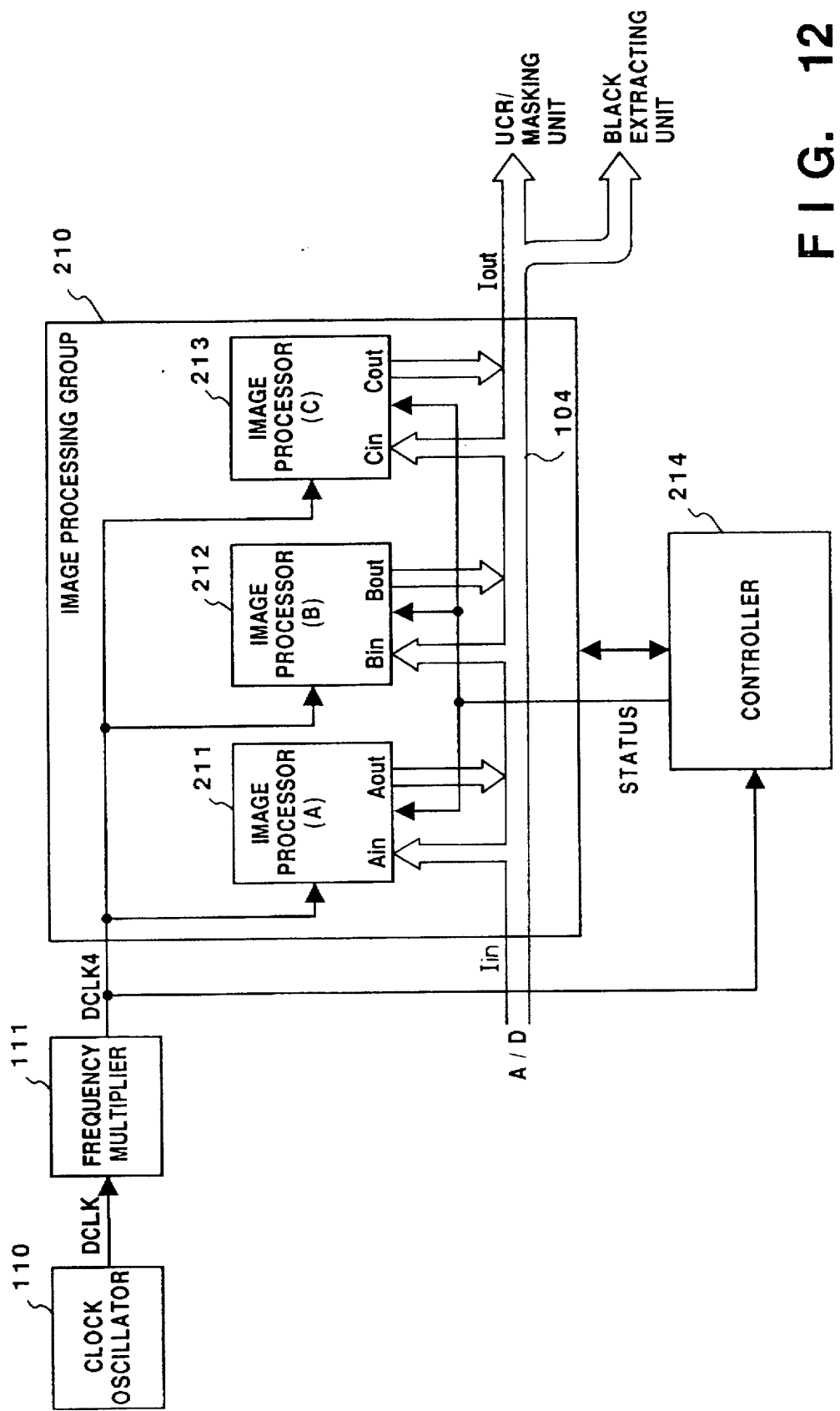
FIG. 12 is a block diagram showing the construction of an image processing apparatus according to a fifth embodiment of the present invention.

FIG. 12 is a block diagram showing the construction of an image processing apparatus according to the fifth embodiment of the invention. This embodiment differs from the first embodiment of FIG. 3 in that image processors 211–213 in an image processing group do not have counters, and a controller 214 performs input/output of data in accordance with the value of a two-bit status signal transmitted in synchronization with DCLK4.

FIG. 13A is a timing chart showing the timing between an image signal and the image clock DCLK according to the fifth embodiment. Here a status signal STATUS of, e.g., two bits, is sent to each of the image processors, and it will suffice if each image processor sets a predetermined connection state in conformity with the status signal.

FIG. 13B is a table showing the relationship between the status signal STATUS and data input/output in the fifth embodiment.

In accordance with the table shown in FIG. 13A, data input/output can be decided depending upon the status signal STATUS without relying upon a counter.

<Sixth Embodiment>

A sixth embodiment will now be described in which the present invention is applied to the image processing circuitry of a monochromatic digital copying machine.

Figure 14:
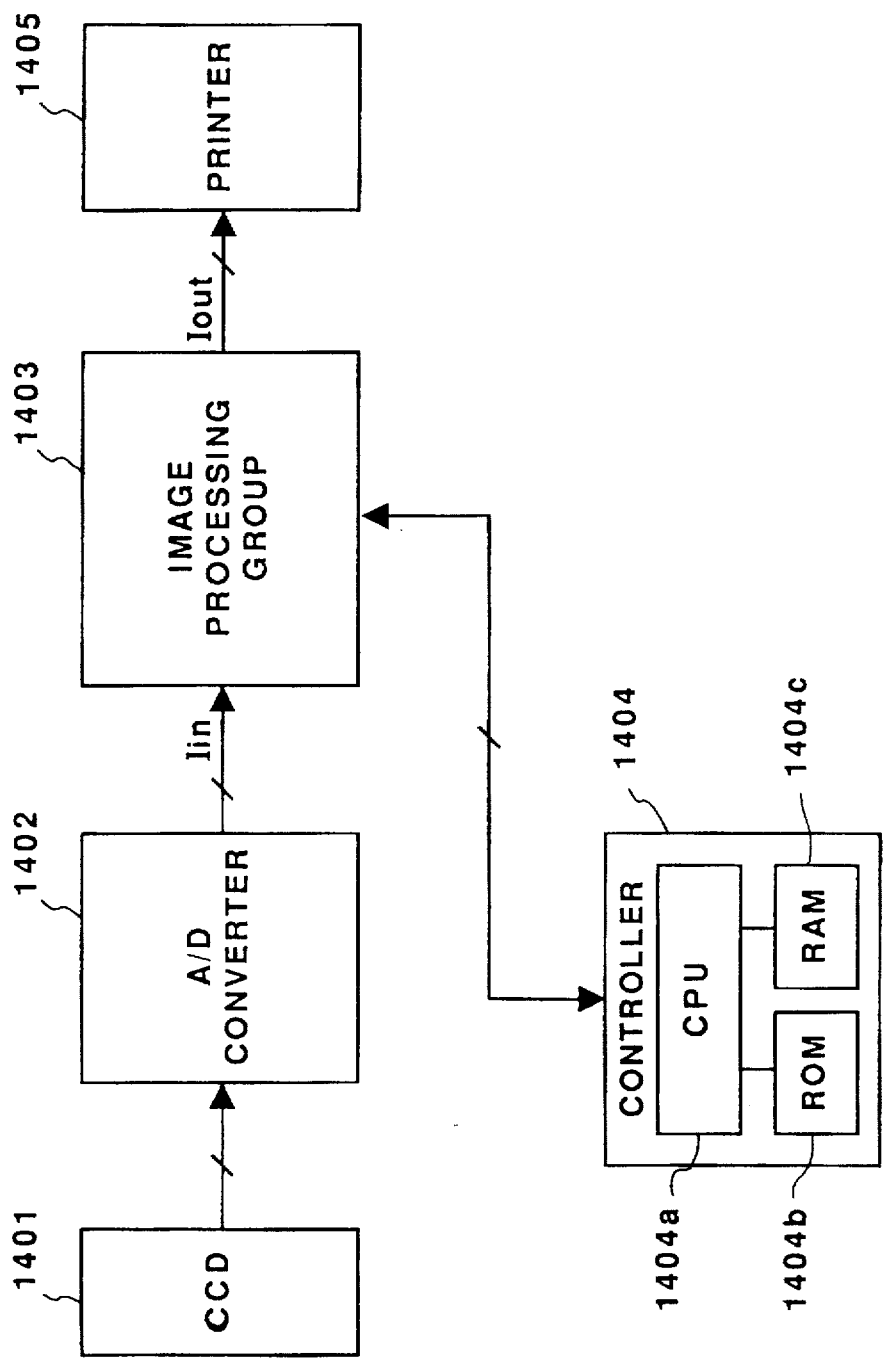
FIG. 14 is a block diagram showing the image processing system of a monochromatic digital copying machine according to a sixth embodiment of the present invention.

FIG. 14 is a block diagram showing the image processing system of a monochromatic digital copying machine according to the sixth embodiment. In FIG. 14, numeral 1401 denotes a CCD, 1402 an A/D converting unit, 1403 an image processing group, 1404 a controller and 1405 a printer. An image that has been formed on the CCD 1401 is photoelectrically converted into an analog image signal. This signal is then applied to the A/D converting unit 1402, which includes an amplifier, a sample-and-hold circuit and an A/D converter. The A/D converting unit 1402 outputs an eight-bit digital image signal. The digital image signal is applied to the image processing group 1403, at which the signal is subjected to image processing such as enlargement, reduction, edge emphasis and γ-correction. The processing of the image processing group 1403 is controlled by the controller 1404, which comprises a ROM 1404b, a RAM 1404c and a CPU 1404a, etc. The image signal which has undergone image processing is fed into the multivalued printer 1405, which performs printing in accordance with a technique such as the well-known dither method.

FIG. 15 is a circuit diagram showing the construction of an image processing apparatus according to the sixth embodiment of the present invention. The image processing group 1403, which is composed of processing blocks A, B and C, executes the three processes (A), (B) and (C), respectively. In FIG. 15, numerals 1506, 1511, 1516 denote image processors for executing the respective processes (A), (B) and (C).

Also shown in FIG. 15 are latches 1501, 1504, 1505, 1508, 1510, 1513, 1515 and 1518, tri-state buffers 1502, 1507, 1512 and 1517, and NAND gates 1503, 1509, 1514 and 1520.

Figure 16B:
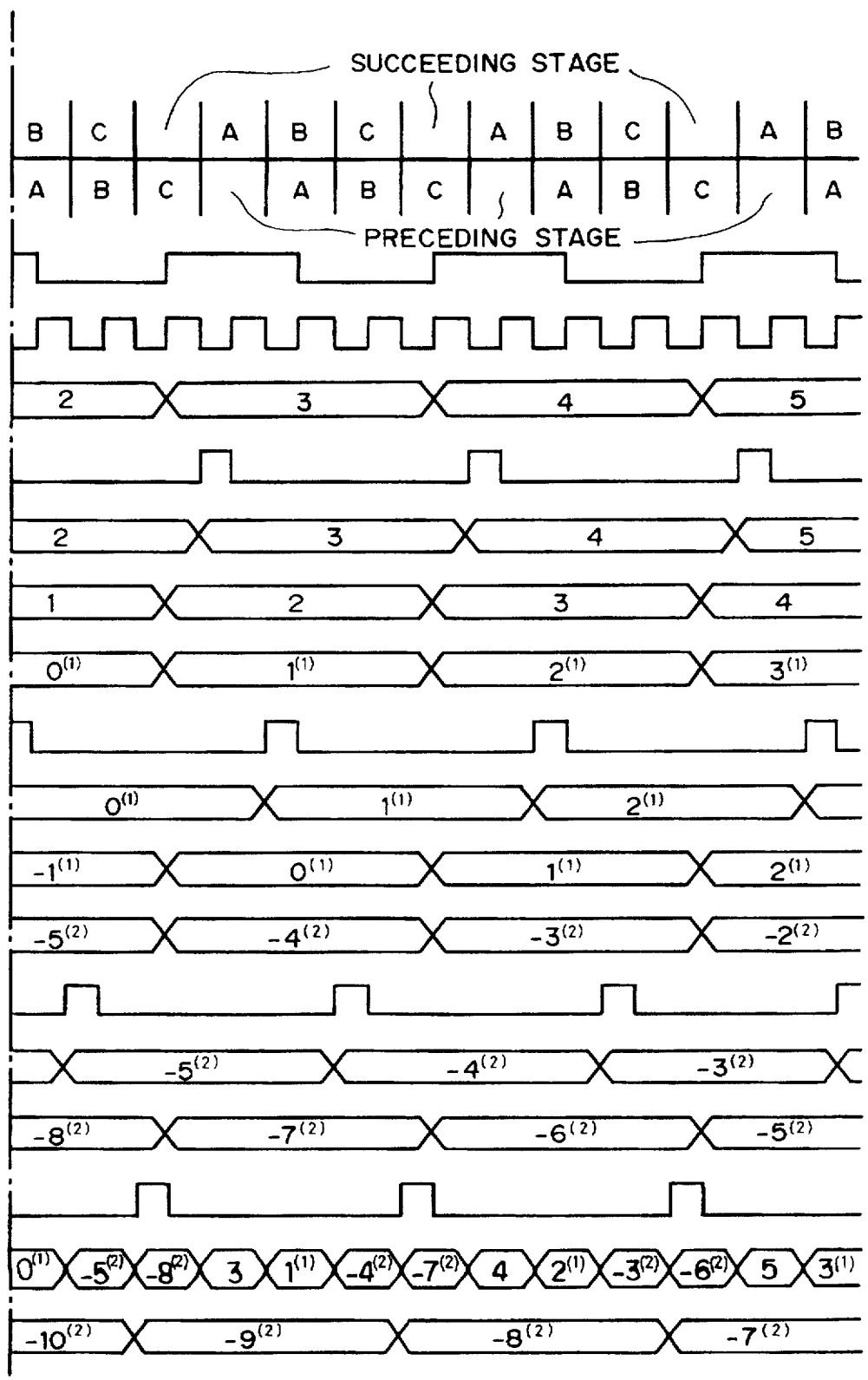

FIGS. 16A and 16B are timing charts associated with the circuitry of FIG. 15. If processing is executed in the order (A), (B), (C), first the image signal $I_{IN}$ inputted to the image processing group 1403 is latched by the latch 1501 at the leading edge of DCLK, whereby a signal $I_1$ is obtained. This signal passes through the tri-state buffer 1502 and then is latched by the latch 1504 at the leading edge of $A_{IN}$, whereby a signal $A_1$ is obtained.

Next, this signal is latched by the latch 1505 at the leading edge of DCLK, whereby a signal $A_2$ is obtained. The image signal $A_2$ is processed by the image processor 1506 in synchronization with DCLK, and the signal is outputted as $A_3$ upon being delayed by one line and one clock pulse in DCLK units.

In synchronization with DCLK, an image signal $B_2$ is processed by the image processor 1511 at the generation of one line and four clock signals. After a signal $C_2$ is processed by the image processor 1516 at generation of two clocks, the image signal is latched by the latch 1518 at the leading edge of $D_{OUT}$. The output of latch 1518 is latched by the latch 1519 at the leading edge of DCLK, as a result of which $I_{OUT}$ is obtained. All of the signals from the CCD 1401 to just before the printer 1405 are processed in synchronization with DCLK, and only the changeover of the image bus $D_{BUS}$ is carried out in synchronization with DCLK4. DCLK is a clock obtained by multiplying DCLK4 by four. FIGS. 16A and 16B illustrate timing charts showing the relationship between the clocks and the image signal.

In FIG. 16, the numbers "–7"~"5" used for the image signals $I_1$, $A_1$~$A_3$, $B_1$~$B_3$ and $C_1$~$C_3$ are numbers which, when a specific pixel is taken as the 0th pixel, represent the delay of pixels relative to this pixel. For example, the image signal of number "–2" is indicative of data of a pixel processed one pixel ahead of the pixel of number "–1". Further, the image signal of number "2" is indicative of data of a pixel processed one pixel after the pixel of number "1". Furthermore, the numerals within the parentheses at the upper right of the numbers represent delays in terms of one line units, in which $-2^{(2)}$ indicates that the data is that of a pixel processed one line ahead of $-2^{(1)}$.

The manner in which the image signal on the image bus $D_{BUS}$ changes is illustrated as $D_{BUS}$ in FIG. 16. A table indicating the input/output states of each processing block is shown at the top of the timing chart. For example, when DBUS is indicative of data of the 0th pixel, the processing block A is the input and the output is the preceding stage, namely the A/D converting unit 1402 which precedes the image processing group 1403. Next, the data of the "2nd" pixel outputted by the processing block A is received by the processing block B.

Figure 17:
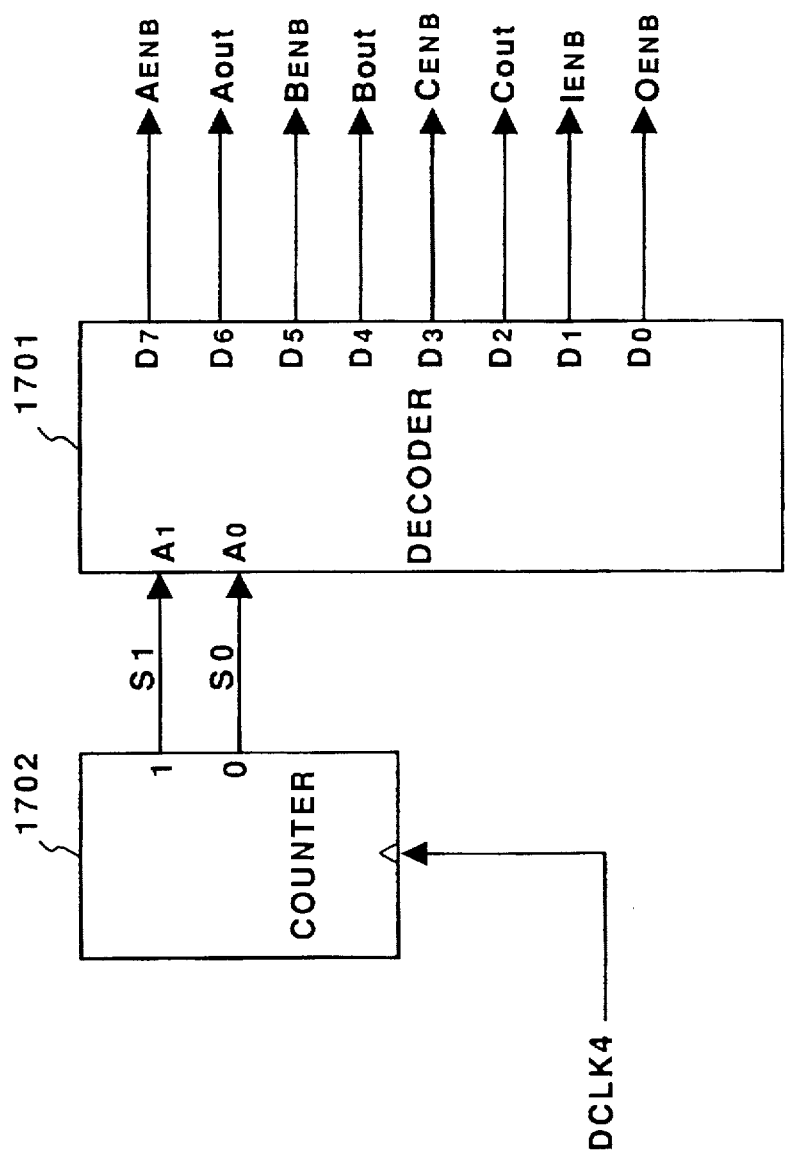
FIG. 17 is a block diagram showing the construction of a decoder according to the sixth embodiment.
Figure 18:
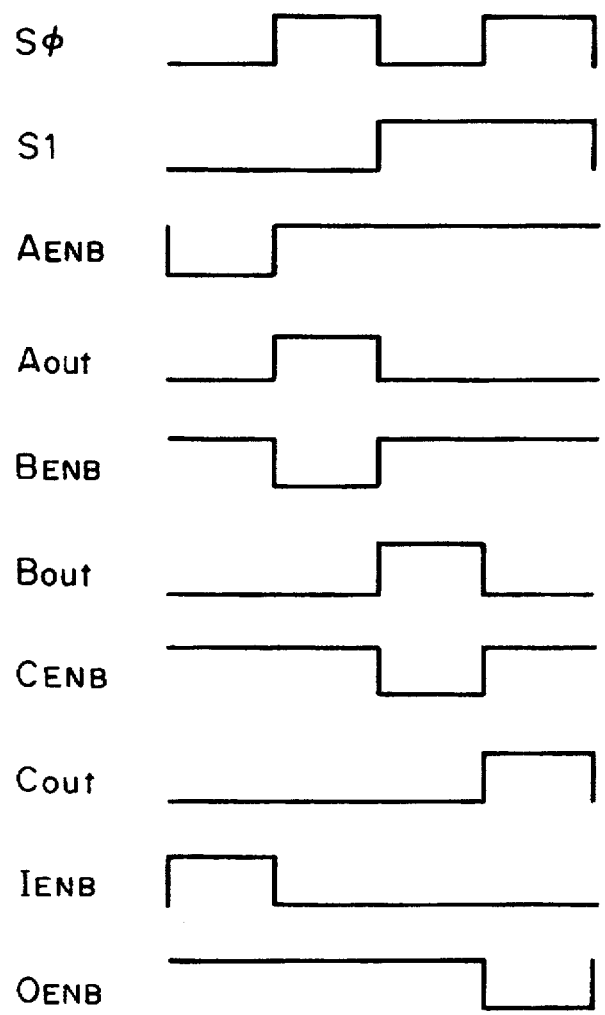
FIG. 18 is a timing chart associated with the circuit of FIG. 17.

FIG. 17 is a block diagram showing the construction of a decoder according to the sixth embodiment, and FIG. 18 is a timing chart associated with the circuit of FIG. 17.

In FIG. 17, 1701 denotes a decoder, and 1702 a counter. As shown in FIG. 17, $A_{ENB}$, $A_{OUT}$, $B_{ENB}$, $B_{OUT}$, $C_{ENB}$, $C_{OUT}$, $I_{ENB}$ and $O_{ENB}$ are generated by the decoder 1701. The relationship between the input signals S0, S1 of the decoder is as shown in FIG. 18. The input signals S0, S1 are generated by the counter 1702 in synchronization with DCLK4. The decoder 1701 has a RAM. The signals S0, S1 are applied to the address inputs of the decoder 1701, which produces outputs from its data terminals. In a case where the decoder 1701 carries out decoding of the kind shown in FIG. 18. 43 is written as data at the 0 address. Similarly, it will suffice to write 201 at the 1 address, 177 at the 2 address, and 172 at the 3 address. Accordingly, by rewriting the contents of the RAM of decoder 1701, the input/output sequence of the processing blocks can be changed at will.

Figure 19:
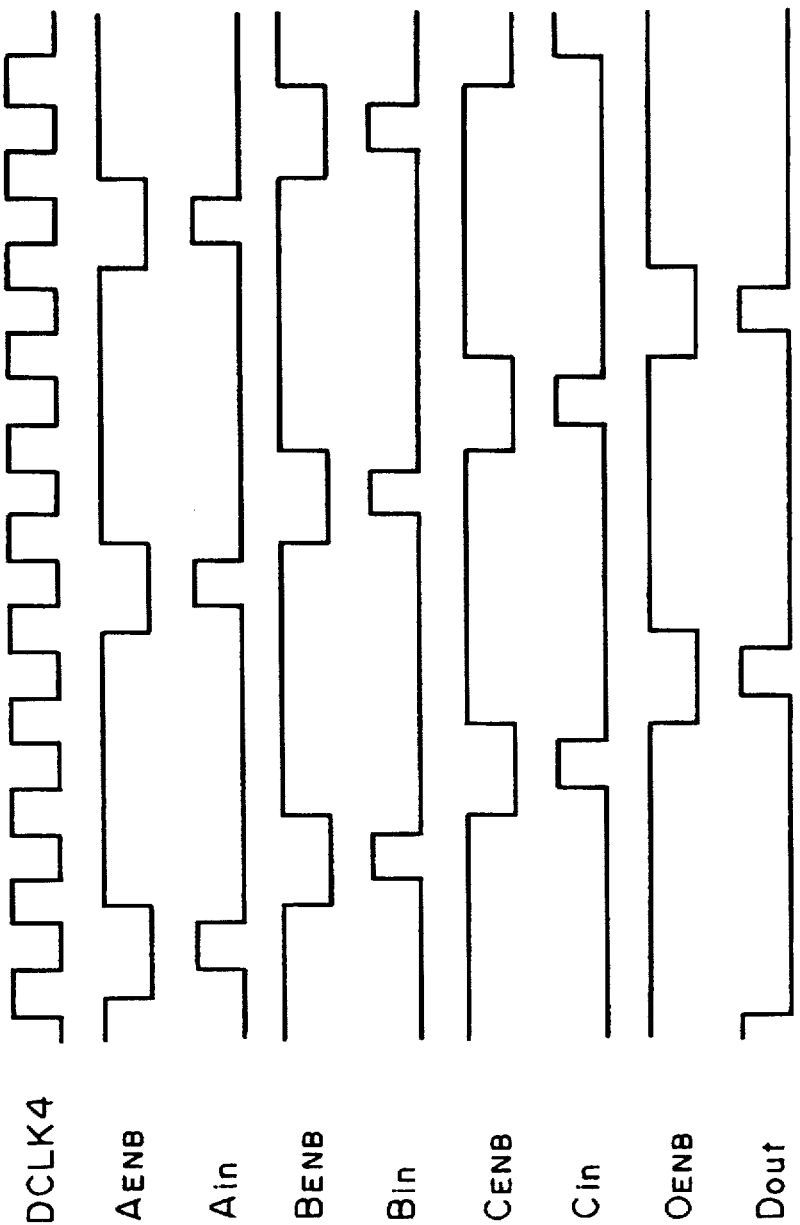
FIG. 19 is a diagram showing the manner in which $A_{IN}$, $B_{IN}$, $C_{IN}$, $D_{OUT}$ are generated in the sixth embodiment.

FIG. 19 is a diagram showing the manner in which $A_{IN}$, $B_{IN}$, $C_{IN}$, $D_{OUT}$ are generated in the sixth embodiment. In FIG. 19, $A_{IN}$ is the output of NAND gate 1503, whose inputs are DCLK4 and $A_{ENB}$. The synchronization of signal $A_{ENB}$ relative to DCLK4 is offset slightly, as shown in FIG. 19, in order to produce a small delay when it is outputted by the decoder 1701. The signals $B_{IN}$, $C_{IN}$, $D_{OUT}$ are produced in a similar manner.

Figure 20:
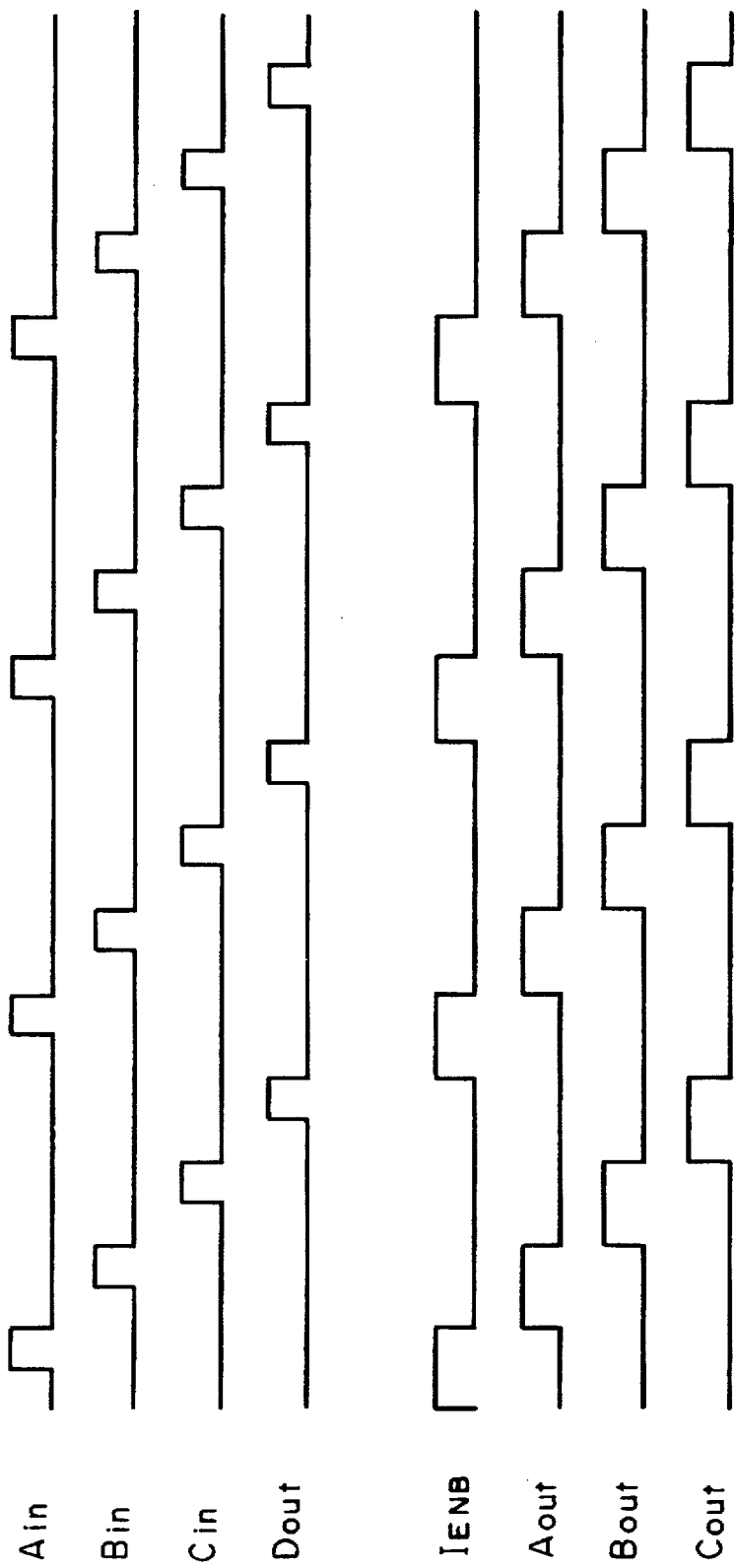
FIG. 20 is a timing chart showing the relationship among $A_{IN}$, $B_{IN}$, $C_{IN}$, $D_{OUT}$, $I_{ENB}$, $A_{OUT}$, $B_{OUT}$, $C_{OUT}$ generated in the sixth embodiment.

FIG. 20 is a timing chart showing the relationship among $A_{IN}$, $B_{IN}$, $C_{IN}$, $D_{OUT}$, $I_{ENB}$, $A_{OUT}$, $B_{OUT}$, $C_{OUT}$ generated in the sixth embodiment. In FIG. 20, $I_{ENB}$ is high at the positive-going transitions of the signal $A_{IN}$, namely when the processing block A is in the input state, and therefore the buffer 1502 of the output from the preceding stage is enabled. The image signal enters the processing block A from the preceding stage. Similarly, the processing block A is in the output state when the processing block B is in the input state, the processing block B is in the output state when the processing block C is in the input state, and the processing block C is in the output state when the succeeding stage is in the input state.

As for the functions of the image processing blocks, the processing block A is for a zoom function, the processing block B for edge emphasis, and the processing block C for γ-conversion. A specific method of realizing the functions of these processing blocks will now be described.

Gamma-conversion processing according to this embodiment will now be described.

Figure 21:
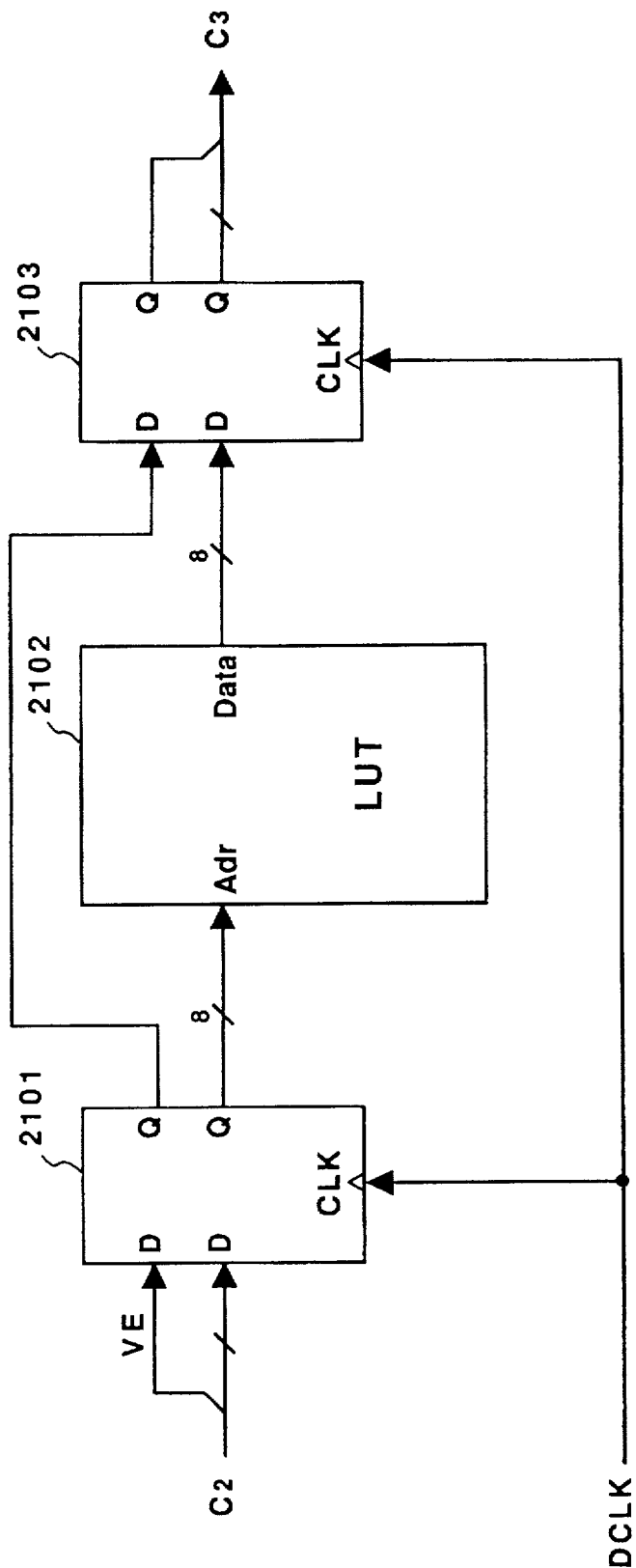
FIG. 21 is a block diagram showing a circuit for a γ-conversion according to the sixth embodiment.

FIG. 21 is a block diagram showing a circuit for a γ-conversion according to the sixth embodiment. The γ-conversion is processing for subjecting an image to a density conversion. This corresponds to the image processor 1516 which executes the process (C) in FIG. 15.

In FIG. 21, numerals 2101, 2103 denote latches which latch their input signals to outputs at the leading edge of DCLK. A signal VE represents the image interval. This signal is used as $C_2$ and is received on the image bus $D_{BUS}$ along with the image signal. Numeral 2102 designates a look-up table constituted by a RAM. An eight-bit input signal is inputted as an address, and eight-bit data corresponding to this address is outputted from the data terminal of the same table.

The reason for passing the signal VE through the latches 2101 and 2103 is to maintain the synchronized relationship to the image signal by delaying the signal VE by the same amount as the image signal. After the signal VE has passed through the latch 2103, it is again transmitted as a signal $C_3$ on the $D_{BUS}$ along with the image signal.

Edge emphasizing processing according to this embodiment will be described next.

Processing for emphasizing the edges of characters or the like in order to increase the sharpness of the image is referred to as edge emphasis. To this end, data indicative of a pixel is subjected to masking processing using a matrix of the following kind:

$$\frac{1}{4} \begin{bmatrix} 0 & -1 & 0 \\ -1 & 8 & -1 \\ 0 & -1 & 0 \end{bmatrix}$$

Figure 25:
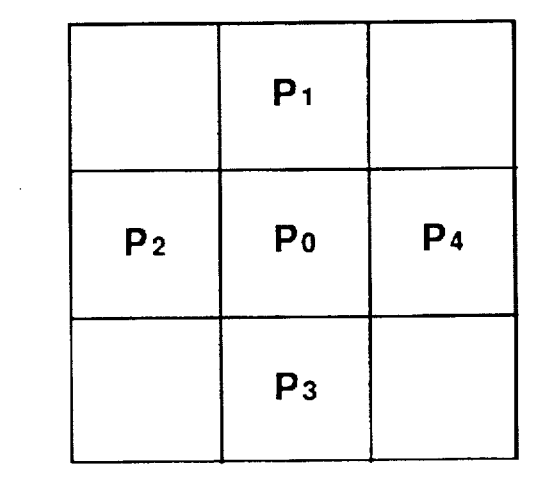

FIG. 25 is a diagram illustrating an example of a mask for edge emphasis to the sixth embodiment. In FIG. 25, in which it is assumed that the pixel of interest is $P_0$, the density of $P_0$ is substituted for $P_0'$, which is defined by Eq. (1) below.

$$P_0'=(8 \times P_0-P_1-P_2-P_3-P_4)+4 \tag{1}$$

FIG. 23 is a block diagram for implementing Eq. (1) by hardware. In FIG. 23, numerals 2301, 2305~2311, 2317, 2318, 2321~2323 denote latches, 2304 a register, 2312~2316 multipliers, 2319 an adder, 2320 a selector, and 2302, 2303 FIFOs (first in first out).

The output values of the latches 2305~2310 are multiplied by the value of a coefficient set in the register 2304 using the multipliers 2312~2316. The outputs of the multipliers 2312~2316 are added using the adder 2319, the output of which corresponds to $P_0'$ in Eq. (1).

The output of the adder 2319 is applied to the B input of the selector 2320. The signal applied to the A input is data corresponding to $P_0$ in Eq. (1). The B input is selected as the output of the selector 2320 when the polarity of the input to the SEL terminal is high; the A input is selected when the polarity of the input to the SEL terminal is low.

The signal inputted to the SEL terminal of the selector 2320 is the result of passing a signal SEL, which is transmitted as part of the $B_2$ signal, through the latches 2301, 2321, 2322. The SEN signal is a signal for selecting image processing. Edge emphasis is performed when the signal SEN is high but not when it is low.

The reason for passing the signal VE and the signal SEN through the latches 2317, 2318 and 2321, 2322, respectively, is to maintain the synchronized relationship to the image signal by delaying these signals by the same amount as the image signal. After the signals VE and SEN have passed through the latch 2323, they are again transmitted as a signal $B_3$ on the image bus $D_{BUS}$ along with the image signal.

Zoom processing according to this embodiment will now be described.

Figure 22A:
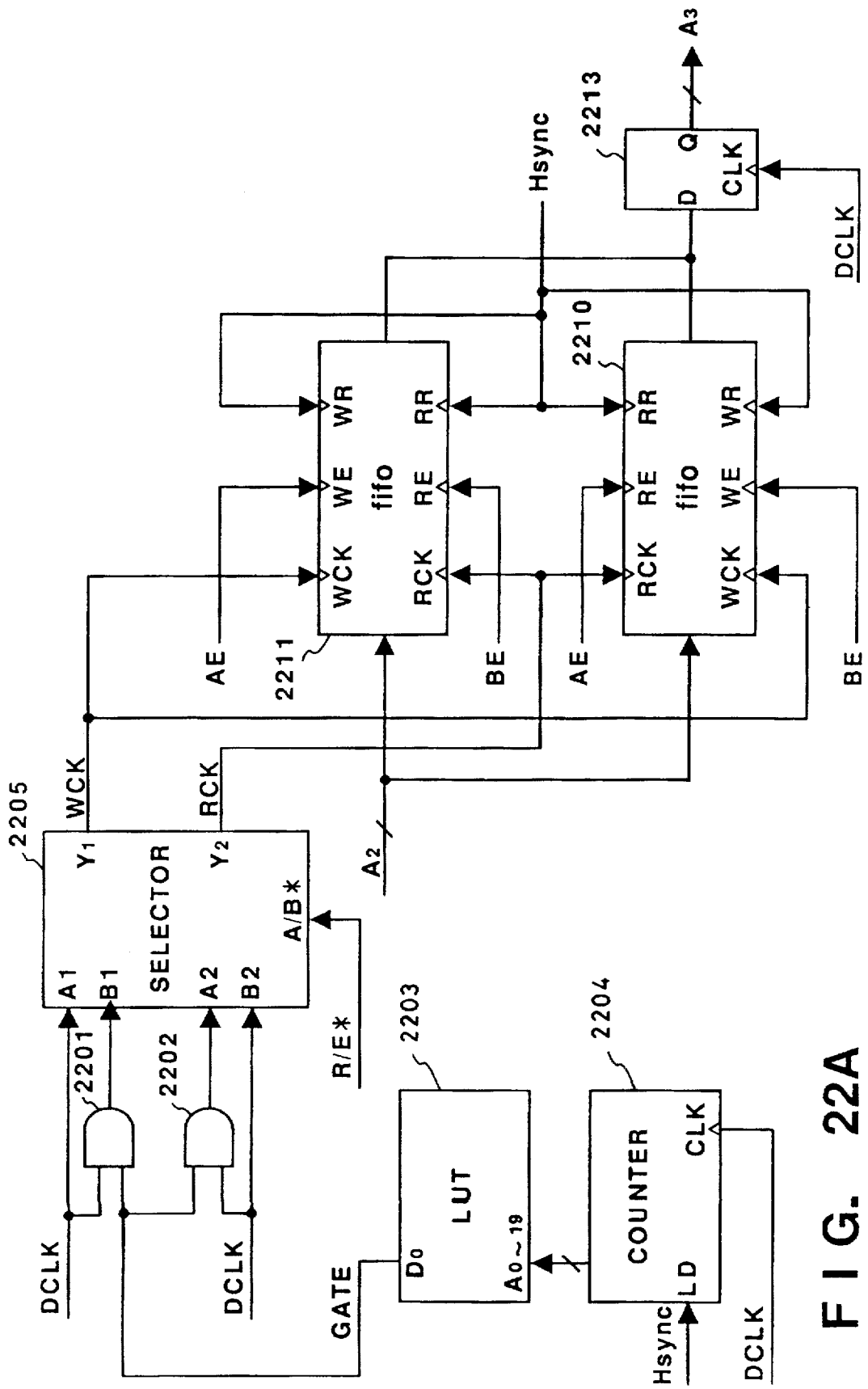
FIGS. 22A, 22B and 22C are block diagrams showing a circuit for performing zooming, inclusive of enlargement and reduction, according to the sixth embodiment.
Figure 22B:
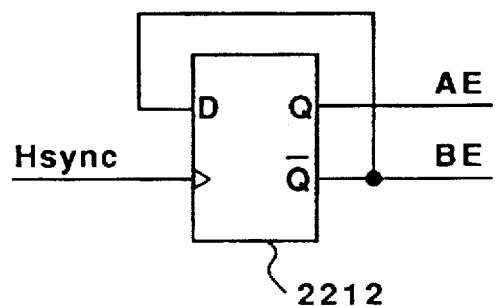
Figure 22C:
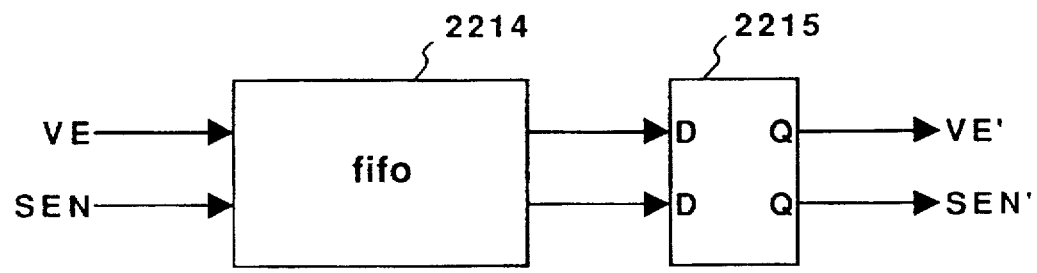

FIGS. 22A, 22B and 22C are block diagrams showing a circuit for performing zooming, inclusive of enlargement and reduction, according to the sixth embodiment.

In FIGS. 22A, 22B and 22C, numerals 2201, 2202 denote AND gates, 2203 a LUT (look-up table), 2204 a counter, 2205 a selector, 2210, 2211, 2214 FIFOs, and 2212, 2213, 2215 latches. An R/E* signal is made high when reduction is performed and low when enlargement is performed. The R/E* signal is outputted from a port of the CPU of the controller 1404 shown in FIG. 14.

Figure 24:
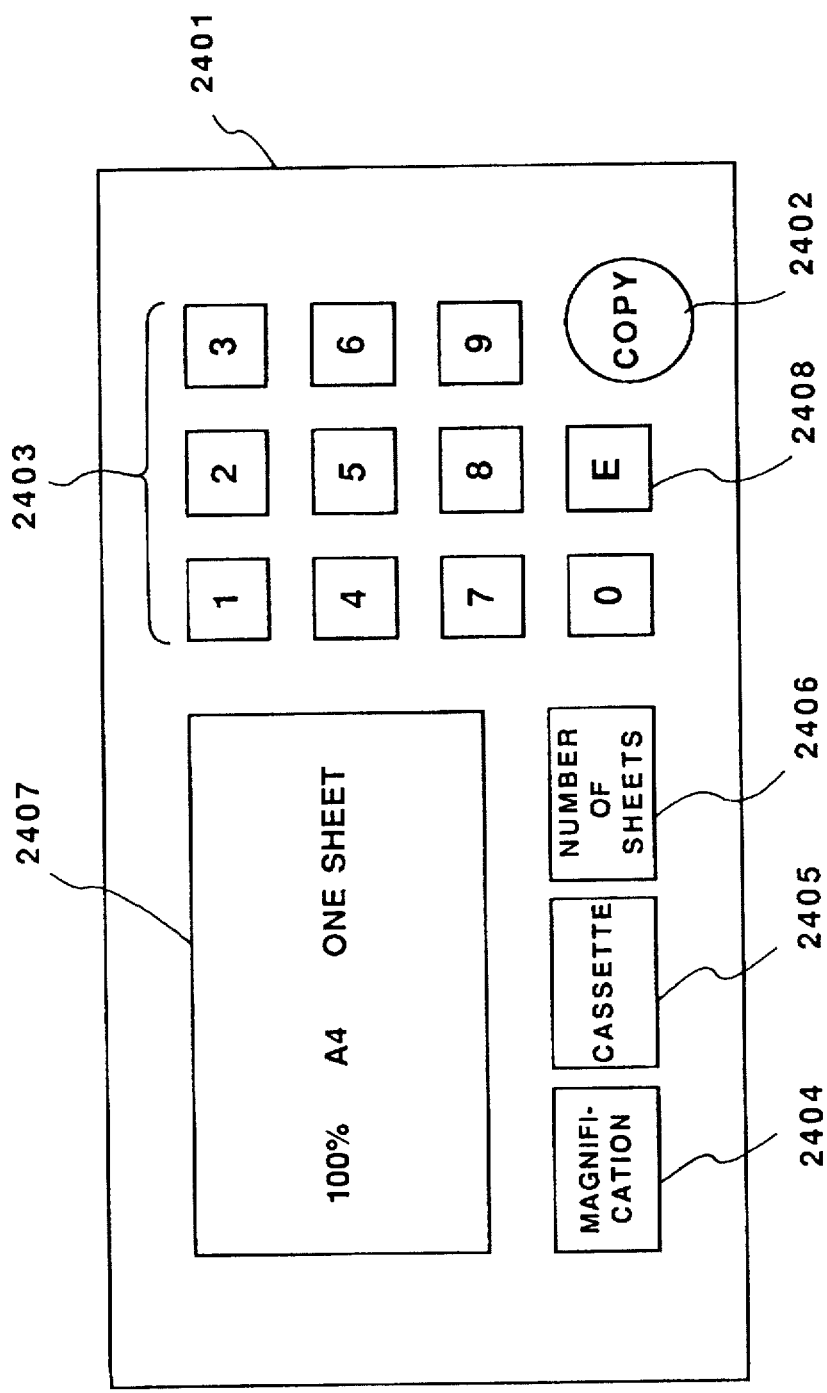
FIG. 24 is a top view showing the panel surface of a control panel according to the sixth embodiment.

FIG. 24 is a top view showing the panel surface of a control panel according to the sixth embodiment. Whether reduction or enlargement is performed is set by the user using a control panel 2401 shown in FIG. 24. Numeral 2403 denotes a ten-key pad and 2404 a magnification setting key. Magnification is set by the ten-key pad 2403 after the key 2404 is pressed. Numeral 2408 designates an enter key which, by being pressed after the ten-key pad, is used to fix the setting of the numerical value. When the magnification has been set to a value greater than 100%, this indicates enlargement. When the magnification has been set to a value of 99% or less, this indicates reduction.

Numeral 2405 denotes a paper-cassette selecting key, 2406 a key for selecting the number of sheets, and 2407 a display unit for displaying the conditions that have been set. When all of the settings have been completed, a copy key 2 is pressed to start the copying operation. Input/output control of the control panel is carried out by the controller 1401 in FIG. 14.

Enlargement processing according to this embodiment will be described next.

Processing for enlarging an image is performed by thinning out a read clock RCK applied to the FIFOs 2210, 2211 of FIG. 22.

Figure 27:
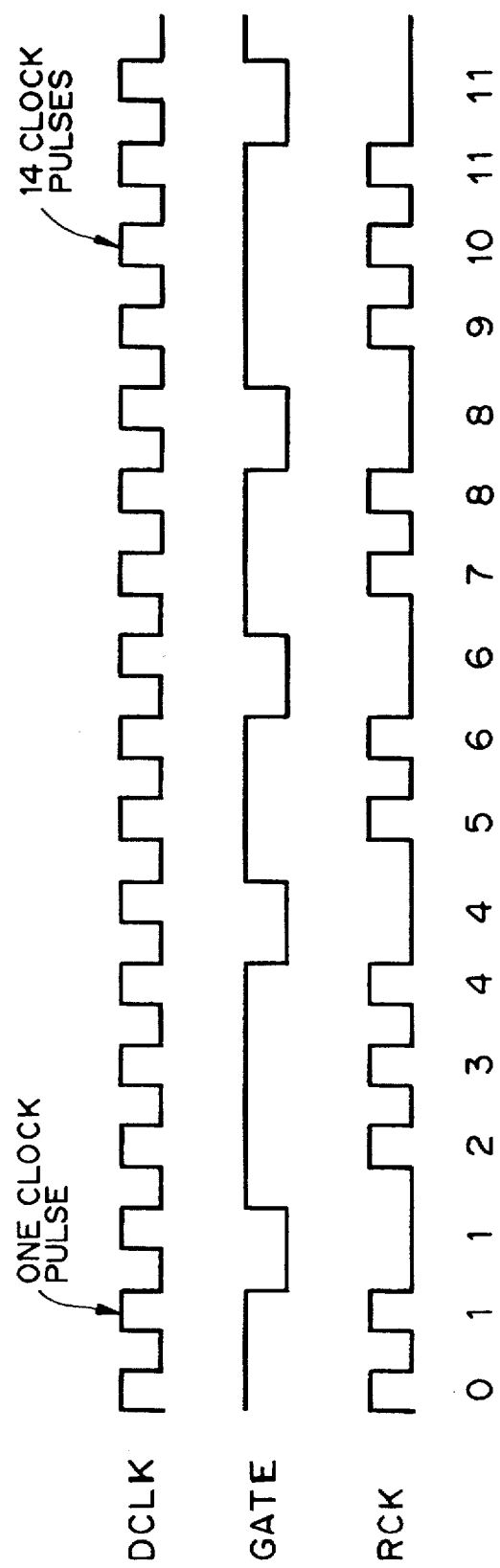
FIG. 27 is a timing chart of zoom processing according to the sixth embodiment.

FIG. 27 is a timing chart of zoom processing according to the sixth embodiment. By way of example, when enlargement at 140% is performed, the 14 read clock pulses to be applied to the FIFOs 2210, 2211 are reduced to only ten. In other words, by reading out new image data only at a ratio of 1/1.4 and repeatedly reading the same data, the amount of data read out is increased by a factor of 1.4. Since 1+1.4= 0.71, 0.71 is cumulatively added to 0 in order. If simple cumulative addition is performed, the results will be 0, 0.71, 1.42, 2.13, 2.84, etc. In the present embodiment, however, rounding off to the nearest whole number is performed and therefore the number series 0, 1, 1, 2, 3 and so on, shown in FIG. 27, is obtained.

If this number series is made to correspond to DCLK and only clock pulses for which there is an increase in the number are adopted as the read clock RCK, the result will be the clock RCK shown in FIG. 27. As will be understood from FIG. 27, 14 clock pulses are produced, but this number is thinned out to ten.

In order to produce the signal RCK in FIG. 22, it will suffice to produce the signal GATE shown in FIG. 27, apply the signal GATE and DCLK to the gate 2202, and employ the output of this gate. To obtain the signal GATE, it will suffice to write data corresponding to the signal GATE in the LUT 2203, and read this data out of the LUT 2203 using the counter 2204. As for the set value of the counter 2204 and the data of LUT 2203, it will suffice to set values conforming to the magnification from the controller 1404 of FIG. 14. An initial value is loaded in the counter 2204 every line in synchronization with a line synchronizing signal $H_{SYNC}$.

At the time of enlargement processing, the R/E* signal assumes the low level in FIG. 22, A1, Y1 are connected, A2, Y2 are connected, and RCK becomes a signal obtained by passing DCLK and the GATE signal through the AND gate 2202. A write clock WCK is the signal DCLK itself.

Figure 26:
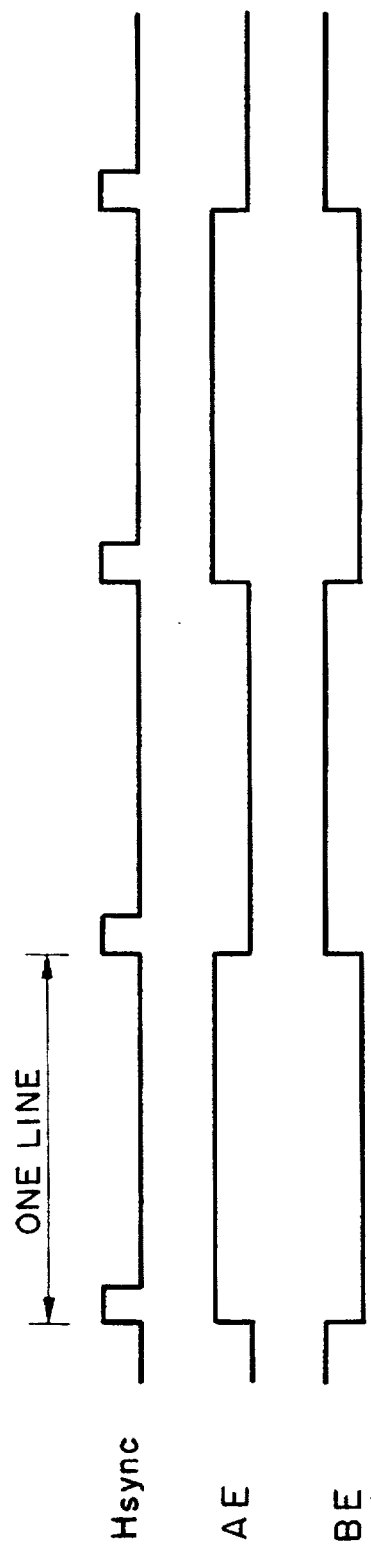
FIG. 26 is a timing chart showing the relationship among $H_{SYNC}$, AE and BE according to the sixth embodiment.

The reading and writing operations of the one-line FIFOs 2210 and 2211 are performed in alternating fashion every line. For example, data is written in FIFO 2210 for a certain line, and data that has been written in one line earlier is read out of the FIFO 2211 in concurrence with the writing of the aforementioned data in FIFO 2210. This is controlled by signals AE and BE, which reverse polarity every line, produced by flip-flop 2212 based upon the line synchronizing signal $H_{SYNC}$. The signal AE is inputted to a read-enable terminal RE and write-enable terminal WE of FIFOs 2210, 2211, respectively, and the signal BE is inputted to a write-enable terminal WE and a read-enable terminal RE of FIFOs 2210, 2211, respectively. The relationship among the signals $H_{SYNC}$, AE and BE is as shown in the timing chart of FIG. 26.

Reduction processing according to this embodiment will now be described.

Reduction processing is executed by thinning out the write clock pulses WCK applied to the FIFOs 2210, 2211 of FIG. 22.

By way of example, when reduction at 70% is performed, the 10 write clock pulses to be applied to the FIFOs 2210, 2211 are reduced to only seven. In other words, by writing in new image data only at a ratio of 70%, the amount of data read out is decreased to 70%.

Figure 28:
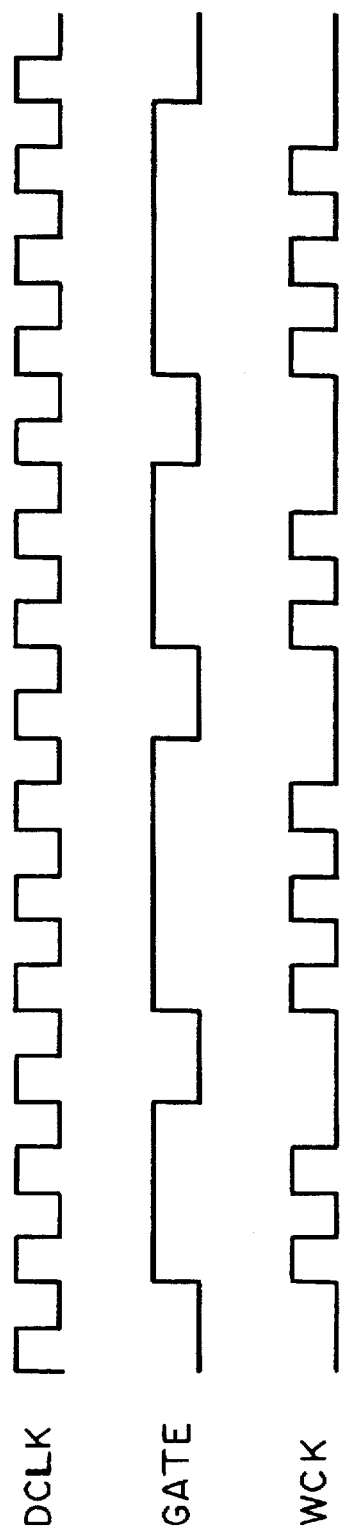
FIG. 28 is a timing chart of reduction processing according to the sixth embodiment.

FIG. 28 illustrates a timing chart of the write clock pulses WCK when it has been thinned out in this manner. In order to produce the signal WCK, it will suffice to produce the signal GATE shown in FIG. 28, apply the signal GATE and DCLK to the gate 2201, and employ the output of this gate. To obtain the signal GATE, it will suffice to write data corresponding to the signal GATE in the LUT 2203, which is constituted by a RAM, and read this data out of the LUT 2203 using the counter 2204, in the same manner as when enlargement is performed.

At the time of reduction processing, the R/E* signal assumes the high level in FIG. 22, B1, Y1 are connected, B2, Y2 are connected, and WCK becomes a signal obtained by passing DCLK and the GATE signal through the AND gate 2201. The read clock RCK is the signal DCLK itself.

The reason for passing the signal VE and the signal SEN through the FIFO 2214 and latch 2215, respectively, is to maintain the synchronized relationship to the image signal by delaying these signals by the same amount as the image signal. The signals VE' and SEN', obtained via the latch 2215, are transmitted as a signal $A_3$ on the image bus $D_{BUS}$ along with the image signal.

A change in the processing sequence will now be described.

Figure 29:
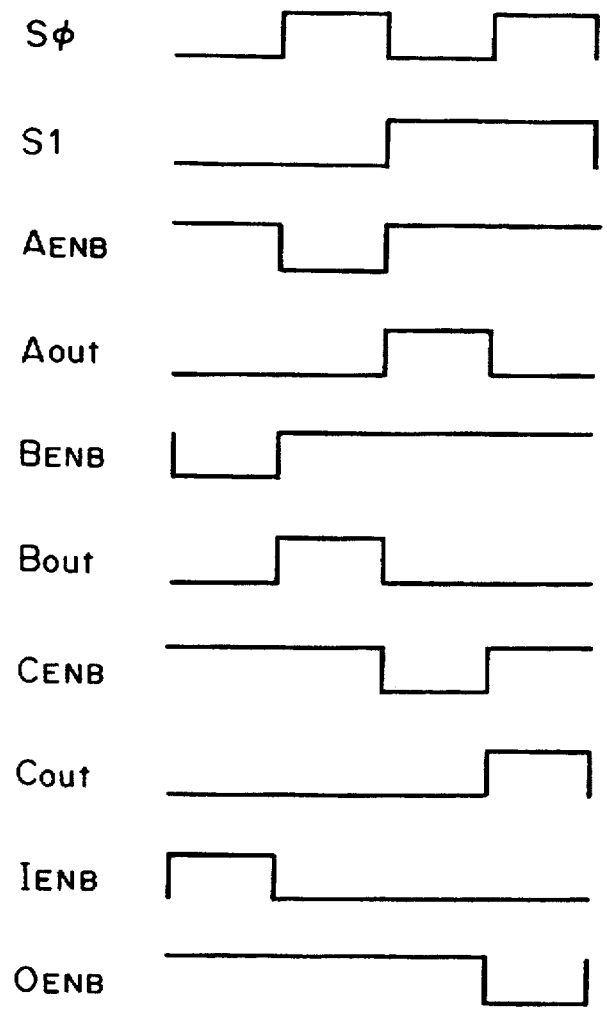
FIG. 29 is a timing chart of a decoder according to the sixth embodiment.

FIG. 29 is a timing chart of a decoder according to the sixth embodiment.

The sequence of zoom processing and edge emphasizing processing at the time of enlargement differs from that at reduction. In other words, when enlargement is performed, processing is executed in the following order: (1) enlargement, (2) edge emphasis and (3) γ-conversion. When reduction is performed, processing is executed in the following order: (1) edge emphasis, (2) reduction and (3) γ-correction. The reason for this is as follows: After reduction, the edge information declines and edge extraction becomes difficult to achieve. Further, if edge emphasis is attempted after enlargement, it is required that the mask for edge extraction be enlarged, and this increases the scale of the circuitry.

In order to change the processing sequence, it will suffice to rewrite the contents of the RAM in decoder 1701 (FIG. 17), as described earlier, thereby enabling decoding as shown in FIG. 29. To this end, 139 should be written as data at the 0 address, 57 at the 1 address, 225 at the 2 address and 172 at the 3 address.

Thus, in accordance with the sixth embodiment as described above, the shared image data bus DBUS is used in time-shared fashion by a plurality of image processing blocks, thereby making it possible to deal flexibly with a change in the processing sequence of image processing.

<Seventh Embodiment>

Three processes are described, namely the process (A) in which zoom processing is executed, process (B) in which edge emphasizing processing is executed, and process (C) in which a γ-correction is executed. However, when it is desired to increase the number of processes, it is possible to expand the shared image bus as well.

FIG. 30 is a block diagram showing the construction of an image processing apparatus according to a seventh embodiment of the present invention.

In the sixth embodiment, a case is described in which the three processes of (A), (B) and (C) are executed using the block diagram of FIG. 15. In the seventh embodiment, the number of processes is increased, and processes (X) and (Y) are capable of being executed instead of process (B).

In FIG. 30, numerals 3001, 3002 denote image processors for performing processes (X), (Y), respectively. Numerals 3003~3010 denote latches, 3011~3014 NAND gates, and 3015~3017 tri-state buffers. A processing block F is a relay processing block for interfacing the image bus DBUS and a shared image bus $D_{BUS2}$ that has been added on. Signals $F_{ENB}$ and $F_{OUT}$ of the processing block F are enabled at timings the same as those of $B_{ENB}$ and $B_{OUT}$, respectively, of the processing block B in the sixth embodiment. In other words, the process of processing block B is merely replaced by the processes of the processing blocks X and Y. This is the same as lengthening, in apparent terms, the processing time of the processing block B as seen from the bus $D_{BUS}$.

The bus $D_{BUS2}$ is used in time-shared fashion by the processing blocks F, X and Y in the same manner as the bus $D_{BUS}$.

<Eighth Embodiment>

Figure 31:
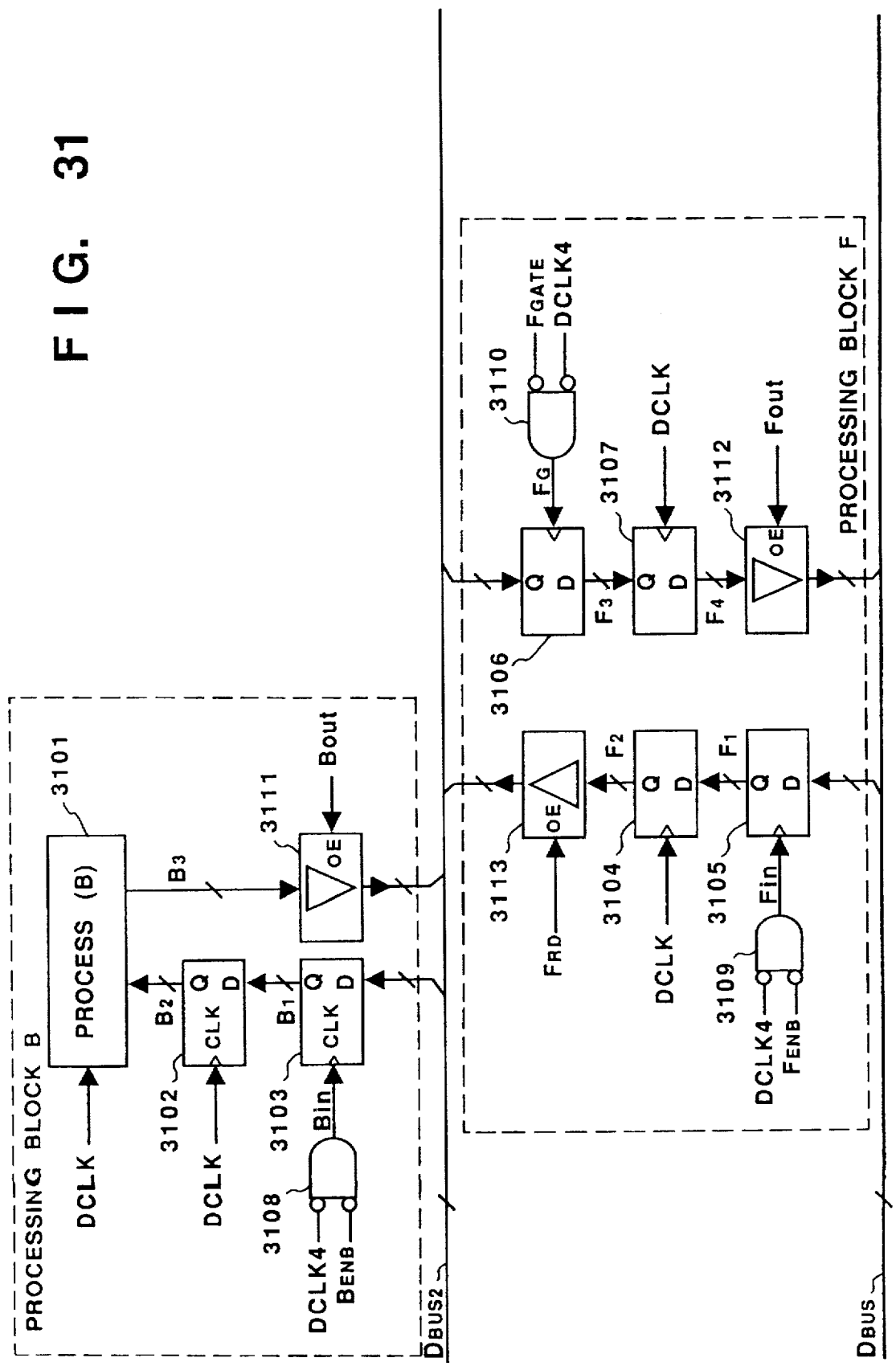
FIG. 31 is a block diagram showing the construction of an image processing apparatus according to an eighth embodiment of the present invention.

FIG. 31 is a block diagram showing the construction of an image processing apparatus according to an eighth embodiment of the present invention.

In FIG. 31, numeral 3101 denotes an image processor, which is in accordance with the eighth embodiment, for executing processing similar to that of processing (B) described above. Numerals 3102~3107 denote latches, 3108~3110 NAND gates, and 3111~3113 tri-state buffers.

In an arrangement similar to that of the seventh embodiment, only the processing block B is capable of being connected to the $D_{BUS2}$, as shown in FIG. 31, so that the processing of the processing block B can be executed twice in succession. In other words, if both $B_{OUT}$ and $B_{ENB}$ are enabled, the processing block B is capable of receiving its own output and of executing processing again. According to this invention, the processing B is that for edge emphasis. Therefore, when the processing is performed twice, edges can be emphasized more than with a single processing operation.

In the present invention, DCLK, DCLK4 or DCLK8 can not only be generated by a frequency multiplier shown in FIG. 3, 5, 10, or 12 but they are also generated a frequency divider which divides very high frequency reference clock.

<Ninth Embodiment>

A ninth embodiment of the present invention will now be described.

According to a ninth embodiment of the present invention, an arrangement is adopted in which the image processing unit constituting the aforementioned image processing group 1403 is detachable, wherein the method of control performed by the controller can be changed depending upon whether the image processing unit is attached or not. More specifically, this embodiment illustrates an example of the image processing apparatus in which the control method is capable of being set automatically to the control method possessed by the image processing unit attached. It goes without saying that the image processing apparatus of this embodiment is applicable to an image forming apparatus or a copying apparatus.

The construction of the image processing apparatus according to this embodiment will now be described.

Figure 32:
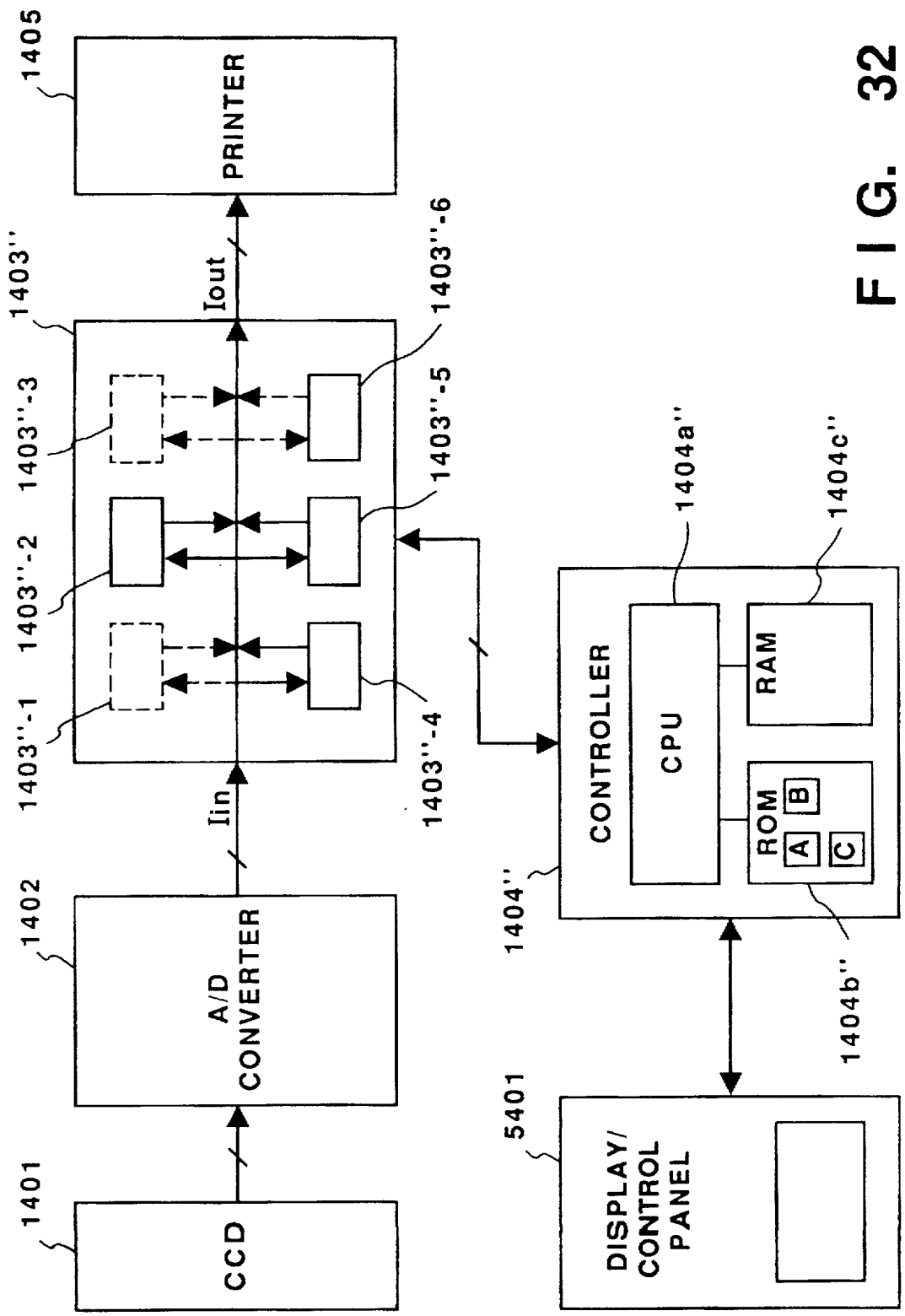
FIG. 32 is a block diagram illustrating the signal processing system of a digital copier according to a ninth embodiment of the present invention.

FIG. 32 is a block diagram illustrating the signal processing system of a digital copier according to the ninth embodiment of the present invention. In FIG. 32, numeral 1404" denotes a controller having a CPU 1404a", a ROM 1404b" and a RAM 1404c". Numeral 5401 denotes a display/control panel having a display unit and a control unit. Numeral 1403" designates an image processing block which includes image processing circuits 1403"-1 through 1403"-6. The circuitry within the block 1403" includes image processing circuitry such as a shading correction circuit 1403"-4, a log converting 1403"-5 and a masking/UCR processing circuit 1403"-6 for the printer 1405 which forms a color image, and image processing circuitry for additional functions, such as a film-projector processing circuit 1403"-1, a digitizer editing processing circuit 1403"-2, and an external video-input processing circuit 1403"-3.

The circuits in the image processing block 1403" comprise one or a plurality of circuit boards. A circuit board used in the image processing circuitry for additional functions is so adapted that it can be readily attached to and detached from the main body of the image processing apparatus without requiring work such as soldering. In FIG. 32, circuit boards for the film-projector processing circuit 1403"-1 and external video-input processing circuit 1403"-3 have been detached from the main body of the image processing apparatus are therefore are indicated by the broken lines.

In this embodiment, the following three methods are illustrated in order to detect the attaching and detaching of the aforementioned circuit boards of the image processing circuitry.

According to the first method, the type of circuit board connected to the main body of the apparatus is inputted by keys on the control unit of the display/control panel 5401 connected to the control unit 1401", and a signal indicative of the type of circuit board is transmitted to the CPU 1404a" in the controller 1404".

According to the second method, the circuit board of the controller 1404" is provided with an information input switch, such as a dip switch, and the output of the switch is transmitted directly to the CPU 1404a".

According to the third method, the image processing circuits 1403"-1 through 1403"-6 are provided with memories storing identification codes of the respective circuits, and the identification code stored in a particular memory is recognized by the CPU 1404a", whereby the type of circuit board connected to the main body of the apparatus is capable of being identified.

An example of the display on the display/control panel 5401 will now be described in conformity with the type of circuit board attached to the main body of the apparatus.

Figure 34:
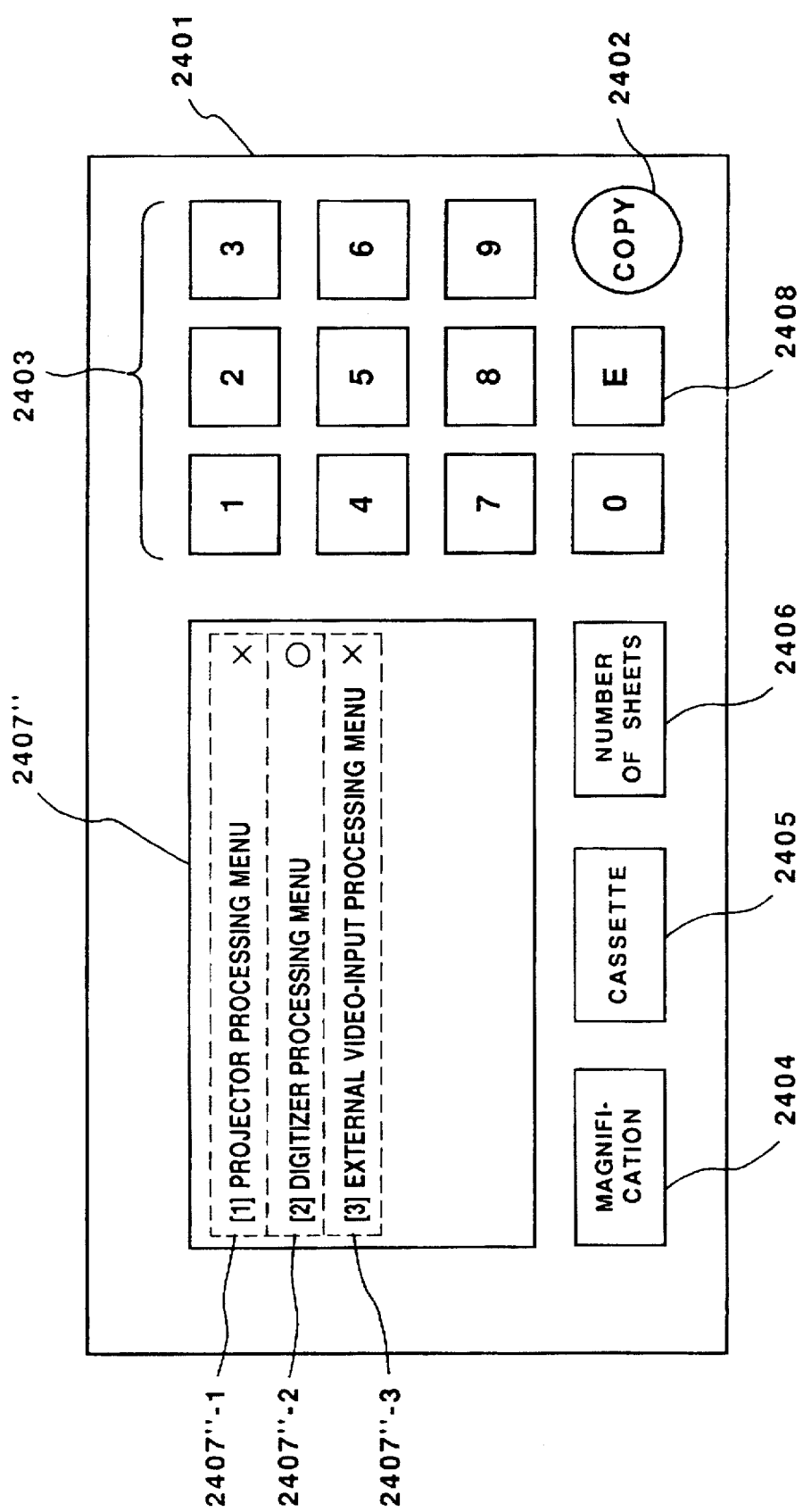
FIG. 34 is a top view showing the panel surface of the control panel according to the ninth embodiment.

FIG. 34 is a top view showing the panel surface of the control panel according to the ninth embodiment.

In FIG. 34, a display unit 2407" includes a display section 2407"-1 for indicating that the circuit board which includes the projector processing circuit has been attached, a display section 2407"-2 for indicating that the circuit board which includes the digitizer processing circuit has been attached, and a display section 2407"-3 for indicating that the circuit board which includes the external video-input processing circuit has been attached. In the example of FIG. 34, a case is shown in which the circuit board including the projector processing circuit has been attached but not the other two circuit boards.

As illustrated in FIG. 34, the display unit 2407" presents a display indicating that only a digitizer processing menu is capable of being executed. For example, the digitizer processing menu mentions processing which requires a digitizer for color-conversion or masking processing, trimming processing or the like. In order to present a display or execute processing in each of the processing modes, the ROM 1404b" contains an area A storing a program for the circuit board which includes the projector processing circuit, an area B storing a program for the circuit board which includes the digitizer processing circuit, and an area C storing a program for the circuit board which includes the external video-input processing circuit. In the example of FIG. 34, the data of area B in ROM 1404b" is employed.

The operation of this embodiment will now be described.

Figure 33:
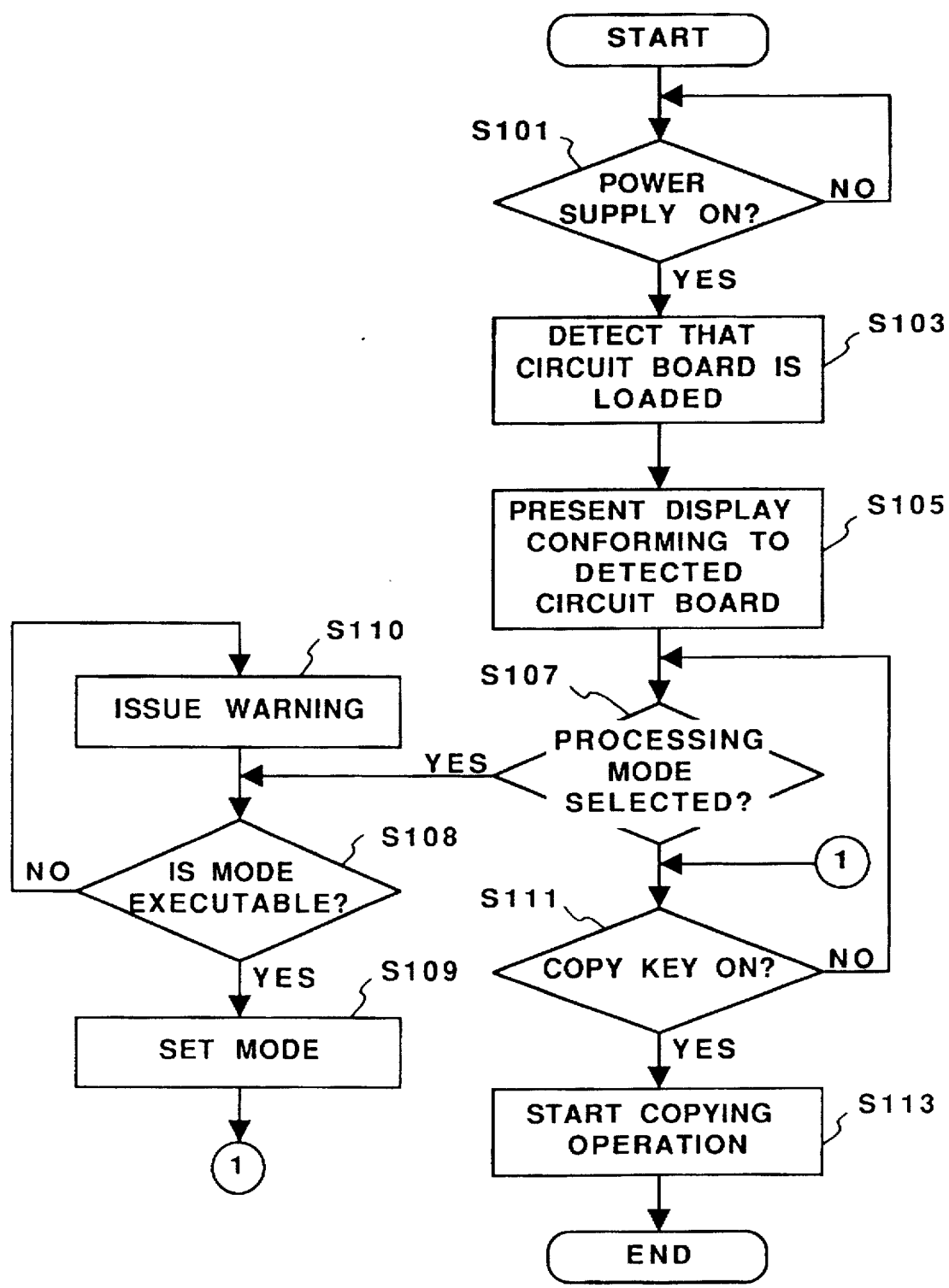
FIG. 33 is a flowchart for describing a copying procedure according to the ninth embodiment.

FIG. 33 is a flowchart for describing a copying procedure according to the ninth embodiment. The operation set forth below is carried out by the CPU 1404a", the program is stored in the ROM 1404b", and the RAM 1404c is used as a working area.

First, at step S101 of the flowchart, it is determined whether the apparatus has been supplied with power from a power supply (not shown). When power is supplied, the loaded circuit board is detected at step S103 by any of the three methods described above, and the detected status is displayed on the display unit 2407" (FIG. 34) at step S105. This display allows the user to identify the circuit board loaded within the apparatus. Next, by manipulating the control unit of the display/control panel 5401, the user selects the processing which conforms to the loaded circuit board. As a result of this operation, the user determines at step S107 whether the processing mode conforming to the loaded circuit board has been selected. The user then determines at step S108 whether the selected processing mode is a mode capable of being executed. If the mode is executable, then the program proceeds to step S109, which calls for the setting of the processing mode selected, as in the above-described example, from among the shading correction processing mode in the projector processing menu, or the color-conversion processing mode, masking processing mode and trimming processing mode in the digitizer processing menu. If the CPU 1404a" determines at step S108 that the mode is not executable, a warning display is presented at step S110. The CPU 1404a" determines at step S111 whether a COPY key has been turned on in the selected mode. If the answer is YES, then the apparatus is caused to start operating.

In the ninth embodiment described above, the loaded circuit boards are detected and a display is presented of all the loaded boards detected, under which conditions the operator selects the executable processing mode. However, the invention is not limited to this arrangement. In order to avoid the selection of a mode that is not executable, an arrangement may be adopted in which the loaded circuit boards are detected and only the executable processing mode is displayed on the display/control panel 5401, thereby eliminating the need for a warning operation.

In this case, it is possible to improve the operability of the apparatus adapted so that the circuit boards of the image processing circuit can be connected and disconnected.

In the ninth embodiment, the sequence of the processes associated with the circuit boards can readily be altered in the same manner as described in relation to FIG. 7. Therefore, the processing menus are inputted, along with numbers [1]–[3] representing the sequence, as illustrated in FIG. 34. For example, a designation that processing for the digitizer processing circuit is to be performed following the processing for the projector processing circuit, or vice versa, can be made under the control of the control circuit 1404. In addition, any such designation can be made.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   image processing means having a plurality of different image processing methods to be applied sequentially to each pixel of an image;
   setting means for variably setting an execution order of the plurality of image processing methods
   generating means for generating a reference pixel clock;
   selecting means for selecting first and second image processing methods from among the plurality of image processing methods in accordance with the execution order set by said setting means and the reference pixel clock generated by said generating means; and
   executing means for executing the image processing methods selected by said selecting means on each pixel, wherein said executing means, while executing the first image processing method on a first pixel of the image, concurrently executes the second image processing method on a second pixel of the image.

2. The apparatus according to claim 1, wherein said image processing means includes counting means for counting the pixel clock generated by said generating means, and said selecting means is operable when a value counted by said counting means attains a count value allocated in advance to each of the plurality of different image processing methods based on said execution order, for selecting the image processing method which corresponds to the count value attained.

3. The apparatus according to claim 1, wherein said image processing means includes transmitting means for transmitting results of processing executed in accordance with any of said plurality of different image processing methods.

4. An image processing apparatus comprising:
   image processing means having a plurality of different image processing methods to be applied sequentially to each pixel of an image;
   setting means for variably setting an execution order of the plurality of image processing methods;
   selecting means for selecting first and second image processing methods from among the plurality of image processing methods in accordance with the execution order corresponding to an area of the image at a time when the area is currently being processed; and
   executing means for executing the image processing methods selected by said selected means on the area, wherein said executing means, while executing the first image processing method on a first pixel of the image, concurrently executes the second image processing method on a second pixel of the image.

5. The apparatus according to claim 4, wherein said image processing means further comprises counting means for counting a reference pixel clock generated by a generating means, and said selecting means is operable when a value counted by said counting means attains a count value allocated in advance of each of the plurality of different image processing methods based on said execution order, for selecting the image processing method which corresponds to the count value attained.

6. The apparatus according to claim 4, wherein said image processing means includes transmitting means for transmitting results of processing executed in accordance with any of said plurality of different image processing methods.

7. An image processing apparatus comprising:
   image processing means having a plurality of different image processing methods to be applied sequentially to each pixel of an image;
   generating means for generating reference pixel clock pulses which exceed at least the number of the plurality of different processing methods in accordance with a pixel clock;
   setting means for variably setting an execution order of the plurality of image processing methods;
   selecting means for selecting first and second image processing methods from among the plurality of different image processing methods in accordance with the execution order set by said setting means and the reference pixel clock pulses generated by said generating means; and executing means for executing the image processing methods selected by said selecting means on each pixel, wherein said executing means, while executing the first image processing method on a first pixel of the image, concurrently executes the second image processing method on a second pixel of the image.

8. The apparatus according to claim 7, wherein said image processing means includes counting means for counting the reference pixel clock pulse generated by said generating means and said selecting means is operable when a value counted by said counting means attains a count value allocated in advance to each of the plurality of different image processing methods based on said execution order, for selecting the image processing method which corresponds to the count value attained.

9. The apparatus according to claim 7, wherein said image processing means includes transmitting means for transmitting results of processing executed in accordance with any of said plurality of different image processing methods.

10. An image processing apparatus comprising:

image processing means having a plurality of different image processing methods to be applied sequentially to each pixel of an image;

generating means for generating a reference pixel clock;

setting means for variably setting an execution order of the plurality of image processing methods;

memory means for storing information indicating the execution order set by said setting means;

selecting means for selecting first and second image processing methods to be executed from among the plurality of image processing methods in accordance with the information stored in said memory means and the reference pixel clock generated by said generating means; and executing means for executing the image processing methods selected by said selecting means on each pixel, wherein said executing means, while executing the first image processing method on a first pixel of the image, concurrently executes the second image processing method on a second pixel of the image.

11. The apparatus according to claim, wherein said image processing means includes transmitting means for transmitting results of processing executed in accordance with any of said plurality of different image processing methods.

12. An image processing apparatus comprising:

image processing means having a plurality of different image processing methods to be applied sequentially to each pixel of an image;

generating means for generating a reference pixel clock;

setting means for variably setting an execution order of the plurality of image processing methods allocating means for allocating data of a pixel before or after a specific pixel to one of the plurality of image processing methods in accordance with the reference pixel clock generated by said generating means and the execution order set by said setting means; and executing means for executing the image processing methods where data of pixels has been allocated by said allocating means on each pixel, wherein said executing means, while executing one of the plurality of image processing methods on a first pixel of the image, concurrently executes another of the plurality of image processing methods on a second pixel of the image.

13. The apparatus according to claim 12, wherein said image processing means includes transmitting means for transmitting results of processing executed in accordance with any of said plurality of different image processing methods.

14. An image processing apparatus comprising:

image processing attachment means for attaching, to said apparatus, any of a plurality of kinds of image processing means capable of being attached to and detached from said apparatus, wherein each kind of image processing means is capable of performing a respective, different kind of image process;

discriminating means for discriminating the kind of image process capable of being performed by the image processing means that is currently attached to said apparatus, such that the kind of image process discriminated by said discriminating means changes with the kind of the image processing means attached to said apparatus; and display means for displaying the kind of image process discriminated by said discriminating means, so that a user can discriminate the image process capable of being performed by the attached image processing means, wherein the attached image processing means performs, in accordance with a start operation initiated by the user, the image process on image data and outputs processed image data.

15. The apparatus according to claim 14, wherein said image processing means includes projector processing means.

16. The apparatus according to claim 14, wherein said image processing means includes digitizer processing means.

17. The apparatus according to claim 14, further comprising setting means for setting an image processing mode selected from plural image processing modes provided by said attached image processing means.

18. The apparatus according to claim 17, wherein said processing modes include a shading correction process.

19. The apparatus according to claim 17, wherein said processing modes include a color conversion process.

20. The apparatus according to claim 17, wherein said processing modes include a masking process.

21. The apparatus according to claim 17, wherein said processing modes include a trimming process.

22. The apparatus according to claim 14, further comprising error display means for presenting an error display when an image processing mode set by said setting means is not included in the image processing modes provided by said attached image processing means.

23. The apparatus according to claim 14, wherein said image processing apparatus is a copy apparatus.

24. The apparatus according to claim 23, further comprising image forming means for forming an image based on the processed image data.

25. The apparatus according to claim 14, further comprising notifying means for notifying an image processing menu which indicates image processes which can be performed by said attached image processing means.

26. The apparatus according to claim 14, wherein said attached image processing means includes processing means for processing a video signal input from an external device.

27. An image processing method comprising:

an image processing step having a plurality of different image processing methods to be applied sequentially to each pixel of an image;

a setting step for variably setting an execution order of the plurality of image processing methods;

a generating step for generating a reference pixel clock;

a selecting step for selecting first and second image processing methods from among the plurality of image processing methods in accordance with the execution order set by said setting step and the reference pixel clock generated by said generating step; and a executing step for executing the image processing methods selected by said selecting step on each pixel, wherein said executing step, while executing the first image processing method on a first pixel of the image, concurrently executes the second image processing method on a second pixel of the image.

28. The method according to claim 27, wherein said image processing step includes a counting step for counting the pixel clock generated by said generating step, and said selecting step is operable when a value counted by said counting step attains a count value allocated in advance to each of the plurality of different image processing methods based on said execution order, for selecting the image processing method which corresponds to the count value attained.

29. The method according to claim 27, wherein said image processing step includes a transmitting step for transmitting results of processing executed in accordance with any of said plurality of different image processing methods.

30. An image processing method comprising:

an image processing step having a plurality of different image processing methods to be applied sequentially to each pixel of an image;

a setting step for setting an execution order of the plurality of image processing methods;

a selecting step for selecting first and second image processing methods from among the plurality of image processing methods in accordance with the execution order corresponding to an area of the image at a time when the area is currently being processed; and an executing step for executing the image processing methods selected by said selecting step on the area, wherein said executing step, while executing the first image processing method on a first pixel of the image, concurrently executes the second image processing method on a second pixel of the image.

31. The method according to claim 30, wherein said image processing step further comprises a counting step for counting a reference pixel clock generated by a generating step, and said selecting step is operable when a value counted by said counting step attains a count value allocated in advance to each of the plurality of different image processing methods based on said execution order, for selecting the image processing method which corresponds to the count value attained.

32. The method according to claim 30, wherein said image processing step includes transmitting means for transmitting results of processing executed in accordance with any of said plurality of different image processing methods.

33. An image processing method comprising:

an image processing step having a plurality of different image processing methods to be applied sequentially to each pixel of an image;

a generating step for generating reference pixel clock pulses which exceed at least the number of the plurality of different processing methods in accordance with a pixel clock;

a setting step for variably setting an execution order of the plurality of image processing methods;

a selecting step for selecting first and second image processing methods from among the plurality of different image processing methods in accordance with the execution order set by said setting step and the reference pixel clock pulses generated by said generating step; and an executing step for executing said image processing methods selected by said selecting step on each pixel, wherein said executing step, while executing the first image processing method on a first pixel of the image, concurrently executes the second image processing method on a second pixel of the image.

34. The method according to claim 33, wherein said image processing step includes a counting step for counting the reference pixel clock pulse generated by said generating step, and said selecting step is operable when a value counted by said counting step attains a count value allocated in advance to each of the plurality of different image processing methods based on said execution order, for selecting the image processing method which corresponds to the count value attained.

35. The method according to claim 33, wherein said image processing step includes transmitting means for transmitting results of processing executed in accordance with any of said plurality of different image processing methods.

36. An image processing method comprising:

an image processing step having a plurality of different image processing methods to be applied sequentially to each pixel of an image;

a generating step for generating a reference pixel clock;

a setting step for variably setting an execution order of the plurality of image processing methods a storing step for storing information indicating the execution order set by said setting step;

selecting means for selecting first and second image processing methods to be executed from among the plurality of image processing methods in accordance with the information stored in said storing step and the reference pixel clock generated by said generating step; and an executing step for executing the image processing methods selected by said selecting step on each pixel, wherein said executing step, while executing the first image processing method on a first pixel of the image, executes the second image processing method on a second pixel of the image.

37. The method according to claim 35, wherein said image processing step includes a transmitting step for transmitting results of processing executed in accordance with any of said plurality of different image processing methods.

38. An image processing method comprising:

an image processing step having a plurality of different image processing methods to be applied sequentially to each pixel of an image;

a generating step for generating a reference pixel clock;

a setting step for variably setting an execution order of the plurality of image processing methods;

an allocating step for allocating data of a pixel before or after a specific pixel to one of the plurality of image processing methods in accordance with the reference pixel clock generated by said generating step and the execution order set by said setting step; and an executing step for executing the image processing methods where data of pixels has been allocated by said allocating step on each pixel, wherein said executing step, while executing one of the plurality of image processing methods on a first pixel of the image, executes another of the plurality of image processing methods on a second pixel of the image.

39. The method according to claim 38, wherein said image processing step includes a transmitting step for transmitting results of processing executed in accordance with any of said plurality of different image processing methods.

40. An image processing method operative in an image processing apparatus, comprising the steps of:

attaching, to the apparatus, any of a plurality of kinds of image processing means, capable of being attached to and detached from the apparatus, wherein each kind of image processing means is capable of performing a respective, different kind of image process;

discriminating the kind of image process capable of being performed by the image processing means that is currently attached to the apparatus, such that the kind of image process discriminated by said discriminating means changes with the kind of the image processing means attached to the apparatus; and displaying, at the apparatus, the kind of image process discriminated by said discriminating step, so that a user can discriminate the image process capable of being performed by the attached image processing means, wherein the attached image processing means performs, in accordance with a start operation initiated by the user, the image process on image data and outputs processed image data.

41. The method according to claim 40, wherein the image processing means includes projector processing means.

42. The method according to claim 40, wherein the image processing means includes digitizer processing means.

43. The method according to claim 40, further comprising a setting step for setting an image processing mode selected from plural image processing modes provided by the attached image processing means.

44. The method according to claim 43, wherein said processing modes include a shading correction process.

45. The method according to claim 43, wherein said processing modes include a color conversion process.

46. The method according to claim 43, wherein said processing modes include a masking process.

47. The method according to claim 43, wherein said processing modes include a trimming process.

48. The method according to claim 40, further comprising an error display step for presenting an error display when an image processing mode set by said setting step is not included in the image processing modes provided by the attached image processing means.

49. The method according to claim 40, wherein the image processing apparatus is a copy apparatus.

50. The method according to claim 49, further comprising an image forming step for forming an image based on the processed image data.

51. The method according to claim 40, further comprising notifying means for notifying an image processing menu which indicates image processes which can be performed by the attached image processing means.

52. The method according to claim 40, wherein the attached image processing means is processing means for processing video signal input from an external device.

* * * * *

UNITED STATES PATENT AND TRADEMARK OFFICE
CERTIFICATE OF CORRECTION

PATENT NO. : 5,742,406

DATED : April 21, 1998

INVENTOR(S) : TAKASHI SUZUKI

It is certified that error appears in the above-identified patent and that said Letters Patent is hereby corrected as shown below:

Title page, item
 [56] REFERENCES CITED

FOREIGN PATENT DOCUMENTS

"1152581" should read --1-152581--.
 1284961                1-284961

COLUMN 1

Line 34, "$G=-255 \cdot \log_{10}[G/255]$" should read
--$M=-255 \cdot \log_{10}[G/255]$--.

COLUMN 2

Line 3, "multlvalued" should read --multivalued--.

COLUMN 7

Line 60, "(D" should read --(D)--.

COLUMN 17

Line 67, "methods" should read --methods;--.

COLUMN 19

Line 14, "means" should read --means,--;
Line 46, "claim," should read --claim 10,--; and
Line 56, "methods" should read --methods;--.

COLUMN 21

Line 9, "a" should read --an--.

UNITED STATES PATENT AND TRADEMARK OFFICE
CERTIFICATE OF CORRECTION

PATENT NO. : 5,742,406

DATED : April 21, 1998

INVENTOR(S) : TAKASHI SUZUKI

Page 2 of 2

It is certified that error appears in the above-identified patent and that said Letters Patent is hereby corrected as shown below:

<u>COLUMN 22</u>

Line 32, "methods" should read --methods;--.

Signed and Sealed this

First Day of December, 1998

Attest:

BRUCE LEHMAN

Attesting Officer

Commissioner of Patents and Trademarks